(12) United States Patent
Sato et al.

(10) Patent No.: US 11,793,614 B2
(45) Date of Patent: Oct. 24, 2023

(54) METHOD FOR PRODUCING DENTURE WITH HIGH ACCURACY OF FITTING OF ARTIFICIAL TOOTH TO SOCKET

(71) Applicant: KABUSHIKI KAISHA SHOFU, Kyoto (JP)

(72) Inventors: Hirokazu Sato, Kyoto (JP); Kunihiro Fujii, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 101 days.

(21) Appl. No.: 17/474,378

(22) Filed: Sep. 14, 2021

(65) Prior Publication Data

US 2022/0096216 A1   Mar. 31, 2022

(30) Foreign Application Priority Data

Sep. 25, 2020  (JP) ................... 2020-160671
May 27, 2021  (JP) ................... 2021-089365

(51) Int. Cl.
*A61C 13/093*  (2006.01)
*A61C 13/10*  (2006.01)

(52) U.S. Cl.
CPC .......... *A61C 13/1006* (2013.01); *A61C 13/10* (2013.01)

(58) Field of Classification Search
CPC ................................................ A61C 13/1006
See application file for complete search history.

(56) References Cited

U.S. PATENT DOCUMENTS

| 2,301,825 | A | * | 11/1942 | Stein .................. A61C 13/1006 |
| | | | | 433/192 |
| 2013/0171588 | A1 | * | 7/2013 | Shima ................ A61C 13/1006 |
| | | | | 433/192 |
| 2017/0007381 | A1 | | 1/2017 | Minakuchi et al. |
| 2017/0189145 | A1 | | 7/2017 | Michii et al. |
| 2019/0247169 | A1 | | 8/2019 | Fisker |
| 2019/0358004 | A1 | * | 11/2019 | Häfele .................... A61C 13/16 |
| 2020/0022790 | A1 | | 1/2020 | Fisker |

FOREIGN PATENT DOCUMENTS

| JP | 2002238925 A | * | 8/2002 | .......... A61C 13/006 |
| JP | 2018-102853 | | 7/2018 | |
| WO | 2015/125573 | | 8/2015 | |
| WO | 2015/194449 | | 12/2015 | |
| WO | 2018/069317 | | 4/2018 | |

* cited by examiner

*Primary Examiner* — Heidi M Eide
(74) *Attorney, Agent, or Firm* — Wenderoth, Lind & Ponack, L.L.P.

(57) ABSTRACT

A method for manufacturing a denture includes: preparing an artificial tooth and a denture base with a concave socket; applying an adhesive to the concave socket; and embedding the artificial tooth in the concave socket to which the adhesive is applied. A socket groove is defined on an inner surface defining the concave socket. The socket groove extends from a concave bottom surface of the concave socket facing a basal surface of the artificial tooth to a lingual concave side surface of the concave socket. Embedding the artificial tooth in the concave socket includes: forming a discharge hole to discharge the adhesive, the discharge hole being defined at an end of the socket groove on a lingual outer surface of the denture base; and discharging the adhesive from the discharge hole.

10 Claims, 19 Drawing Sheets

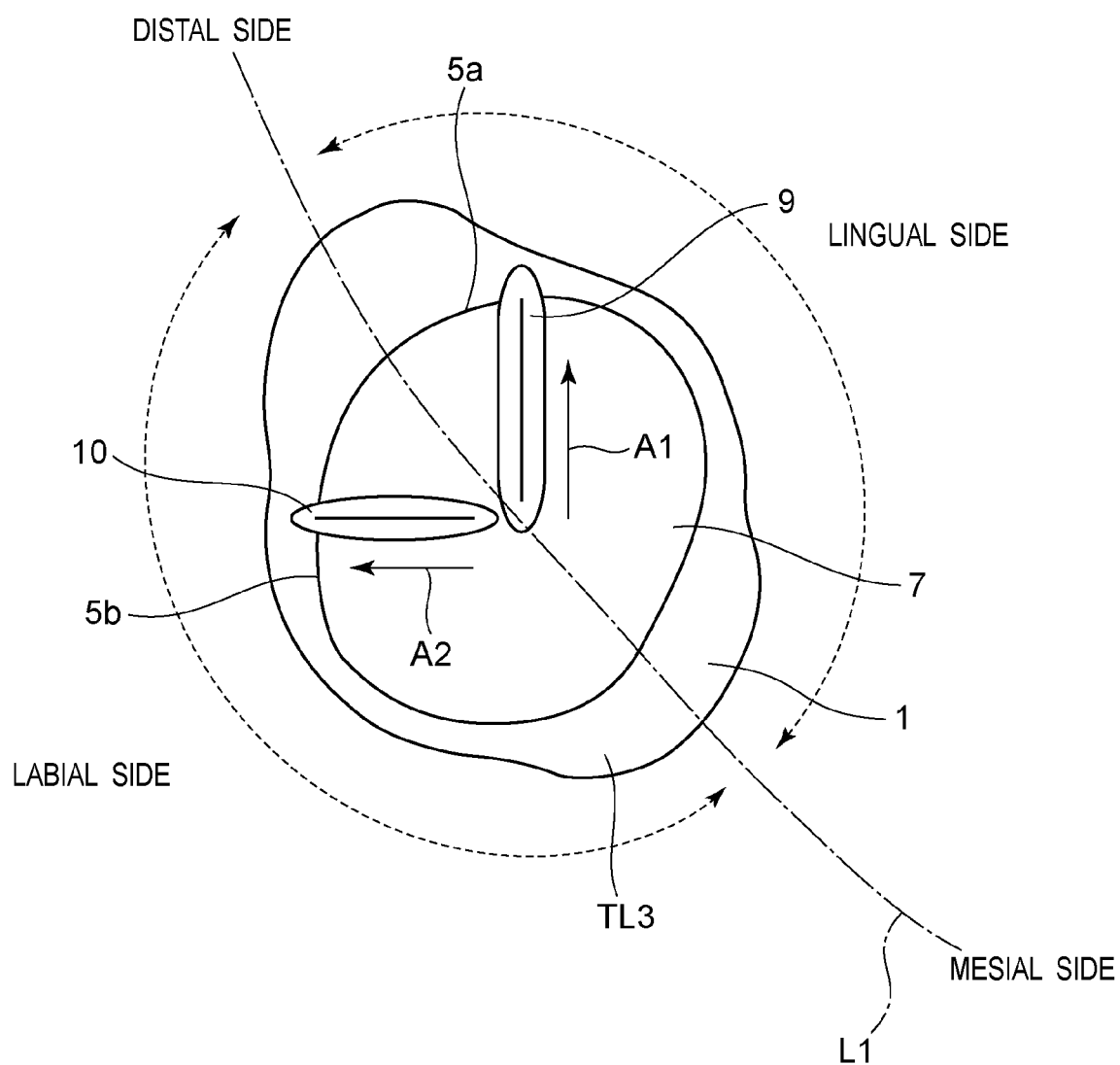

(ARRANGE ARTIFICIAL TOOTH AND FORM GINGIVA)

(FORM SOCKET WITHOUT GROOVE)

(OUTPUT SHAPE DATA OF DENTURE BASE)

PRODUCE DENTURE BASE

APPLY ADHESIVE AND EMBED ARTIFICIAL TOOTH WITH GROOVE

COMPLETE DENTURE (ARRANGE ARTIFICIAL TOOTH AND FORM GINGIVA)

(FORM SOCKET WITH GROOVE)

(OUTPUT SHAPE DATA OF DENTURE BASE)

PRODUCE DENTURE BASE

APPLY ADHESIVE AND EMBED ARTIFICIAL TOOTH WITHOUT GROOVE

COMPLETE DENTURE (ARRANGE ARTIFICIAL TOOTH AND FORM GINGIVA)

(FORM SOCKET WITH GROOVE)

(OUTPUT SHAPE DATA OF DENTURE BASE)

PRODUCE DENTURE BASE

APPLY ADHESIVE AND EMBED ARTIFICIAL TOOTH WITH GROOVE

COMPLETE DENTURE

METHOD FOR PRODUCING DENTURE WITH HIGH ACCURACY OF FITTING OF ARTIFICIAL TOOTH TO SOCKET

CROSS-REFERENCE TO RELATED APPLICATIONS

This application claims priority to Japanese Patent application No. 2020-160671, filed Sep. 25, 2020, and Japanese Patent application No. 2021-089365, filed May 27, 2021, the disclosure of which is incorporated herein by reference in the entirety.

BACKGROUND OF THE INVENTION

1. Field of the Invention

The present invention relates to a denture and a method for manufacturing a plate denture and more particularly to a method for producing a denture based on a computer-aided design/manufacturing method (CAD/CAM).

2. Description of the Related Art

WO 2015/125573 discloses an artificial tooth having a shape corresponding to a denture base designed on CAD based on three-dimensional data before machining. In the artificial tooth described in WO 2015/125573, a means for restricting rotation around a tooth axis is disposed in a portion to be in contact with the denture base, and the restricting means has a shape not engaged with the denture base in a tooth axis direction.

Japanese Patent Publication No. 2018-102853, the floor portion discloses a method for manufacturing a plate denture including: a denture base having a base, multiple sockets formed adjacently in the base and in which artificial teeth are arranged, and a first notch portion disposed in a partition wall between the multiple sockets to partially reduce the height of the partition wall; and artificial teeth fixed to the socket of the denture base.

WO 2015/194449 discloses an artificial tooth having a convex portion to be embedded in an internal corner portion of a concave portion of a denture base, wherein the convex portion has a form forming a predetermined gap from the internal corner portion without coming into contact with the internal corner portion when embedded in the internal corner portion.

WO 2018/069317 discloses a method for producing a denture including a denture base and at least two artificial teeth arranged on the denture base.

SUMMARY OF THE INVENTION

The problem to be solved by the present invention is to provide a denture improved in accuracy of fitting of an artificial tooth to a socket.

The present invention solving the problems will be described below. For easy understanding, reference numerals attached to the description and drawings are also described in parentheses; however, the present invention is not limited thereto.

An aspect of the present invention provides a method for manufacturing a denture according to comprising:
preparing an artificial tooth (1, 1A) and a denture base (3, 3A) provided with a concave socket (2, 2A) in which the artificial tooth (1, 1A) is embedded;
applying an adhesive (12) to the socket (2, 2A); and
embedding the artificial tooth (1, 1A) in the socket (2, 2A) to which the adhesive (12) is applied, wherein
one or more grooves (9, 10, 13, 9A, 10A) are provided on at least one of a surface (5) of the artificial tooth (1, 1A) on the side embedded in the socket (2, 2A) and an inner surface (6) defining the socket (2, 2A), wherein
the one or more grooves (9, 10, 13, 9A, 10A) include a groove (9, 9A, 13) extending to the lingual side, and wherein
the embedding the artificial tooth (1, 1A) in the socket (2, 2A) includes
forming a discharge hole (11, 11A) exposing an end (9a, 9b) side of the groove (9, 9A, 13) extending to the lingual side from the denture base (3, 3A) to discharge the adhesive (12), and
discharging the adhesive (12) from the discharge hole (11, 11A).

An aspect of the present invention provides a denture comprising:
an artificial tooth (1, 1A); and
a denture base (3, 3A) provided with a concave socket (2, 2A) in which the artificial tooth (1, 1A) is embedded, wherein
one or more grooves (9, 10, 13, 9A, 10A) are provided on at least one of a surface (5) of the artificial tooth (1, 1A) on the side embedded in the socket (2, 2A) and an inner surface (6) defining the socket (2, 2A), wherein
the one or more grooves (9, 10, 13, 9A, 10A) include a groove (9, 9A, 13) extending to the lingual side, wherein
an end (9a, 9b) side of the groove (9, 9A, 13) extending to the lingual side is exposed from the denture base (3, 3A), and wherein
the artificial tooth (1, 1A) and the denture base (3, 3A) are bonded and fixed by an adhesive. (12) while the adhesive (12) is disposed in the one or more grooves (9, 10, 13, 9A, 10A).

The present invention can provide the denture improved in accuracy of fitting of an artificial tooth to a socket.

BRIEF DESCRIPTION OF THE DRAWINGS

FIG. 3b is a basal surface view of an artificial tooth of a mandibular canine (third embodiment)

DESCRIPTION OF THE PREFERRED EMBODIMENTS

Background to Present Disclosure

Figure 1:
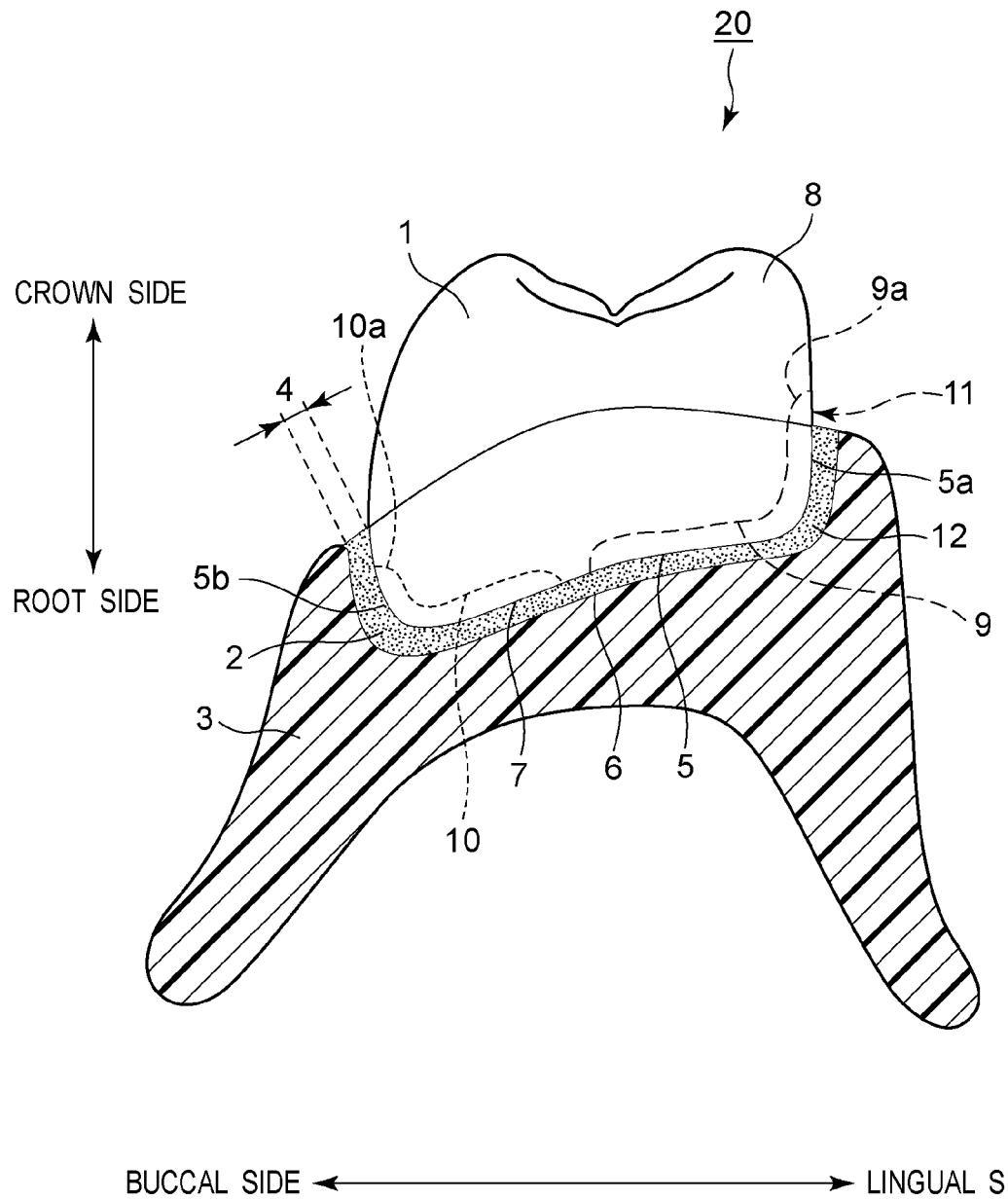
FIG. 1 is a frontal cross-sectional view of a denture (first embodiment, representative example)

In recent, years, in a method of producing a plate denture starting to be put into practical use, a denture is designed on a computer using CAD/CAM technology; a denture base excluding a portion for embedding an artificial tooth is produced by a method such as cutting by an NC machine tool or 3D printing; a ready-made artificial tooth or an artificial tooth manufactured by a method such as 3D printing is coupled by using an adhesive to an artificial tooth embedding portion (referred to as a socket) of the denture base. Generally, in consideration of an error in fitting between the denture base and the artificial tooth, the socket is often provided with a dimension larger than the shape of the artificial tooth so that a gap (offset) is formed between the socket and the artificial tooth. However, in reality, it is difficult to accurately embed the artificial tooth in the socket at a position designed on a computer due to influences of an amount and a viscosity of applied adhesive. Additionally, since an operation of embedding and bonding artificial teeth one by one in the socket is manually performed, the thickness of the adhesive tends to vary, which greatly affects establishment of an occlusal contact relationship of the entire denture and also impairs labor saving.

In other words, even if a denture can be designed in an appropriate occlusal state on a computer, an occlusal relationship needs to be adjusted by grinding due to an influence of an error that actually occurs, which is a major cause of impairing labor saving by digitization and also a major obstacle to the production of highly accurate dentures.

In this operation, it is difficult to control the application amount of the adhesive, and a difference in experience is likely to occur. If the amount of the adhesive is large, the adhesive leaks to a surface of the artificial tooth or a polished surface of the denture base when the artificial tooth is embedded. This not only impairs labor saving due to an operation of wiping off the leaked adhesive and a complicated work such as cutting and polishing in some cases, but also impairs the aesthetics of the artificial tooth, the appearance, of the denture, and the original design shape.

In WO 2015/125573, a restricting means having a shape not engaging with a denture base in a tooth axis direction is disposed in a portion to be in contact with the denture base, and the restricting means prevents an artificial tooth from moving in a rotation direction around the tooth axis. However, it is difficult to control uplifting of the artificial tooth in a vertical direction due to the thickness of the adhesive.

In Japanese Patent Publication No. 2018-102853, in a method disclosed as a method of controlling leakage of an adhesive from between a socket and an artificial tooth, a partition wall disposed between multiple sockets formed adjacent to each other and in which artificial teeth are arranged is designed to be partially made lower in the denture base. However, if the partition wall of the sockets is made lower, the bond strength between the artificial tooth and the denture base cannot be supplemented, and the artificial teeth may fall off due to an occlusal contact between the artificial teeth without food in the oral cavity or an occlusal pressure and an impact of crushing food while food is interposed during eating.

WO 2015/194449 discloses an artificial tooth that can reliably be attached to a denture base when artificial teeth are arranged on the denture base designed and formed by CAD/CAM. However, designing the convex portion of the artificial tooth to be embedded according to the internal corner portion of the concave portion of the denture base and separately shaping the artificial tooth may require a highly accurate and complicated process. Additionally, in the case of a ready-made artificial tooth, this method is difficult to use since the shape of the internal corner portion is determined before the design of the denture base. Furthermore, since the influence of the application amount of the adhesive is not taken into consideration, it is difficult to ensure the stable accuracy of fitting with the artificial tooth.

WO 2018/069317 discloses a denture producing method including producing at least two artificial teeth in a state where a common arrangement support for artificial teeth is connected to at least two artificial teeth. The denture producing method described in WO 2013/069317 is intended to improve the fitting accuracy between a plurality of artificial teeth and sockets; however, since the common support is disposed in a place responsible for a morphologically important function such as the lip surface and the occlusal surface appearing to the outside, a cutting mark remain due to removal of the support, so that a very complicated work such as restoration of surface characteristics and adjustment of occlusal relationship may be performed.

Therefore, to solve the problems, the present inventors conducted study to enable more efficient work, achieve high accuracy of fitting of an artificial tooth to a socket, and establish a high-precision occlusal contact relationship between the upper and lower jaws, without impairing the merit of labor saving in the computer-aided (CAD/CAM) denture production. More specifically, the present inventors conducted study on a method of producing a denture including filling the adhesive evenly in the socket and suppressing a leakage to the outside of the socket to a requisite minimum to eliminate extra adjustment work so that the denture is hardly affected by the application amount of the adhesive.

As a result, the including filling the adhesive evenly in the socket and suppressing a leakage to the outside of the socket to a requisite minimum to eliminate extra adjustment work so that the denture is hardly affected by the application amount of the adhesive. In other words, the present inventors conceived the method of producing a denture enabling more efficient work, achieving high accuracy of fitting of an artificial tooth to a socket, and establishing a high-precision occlusal contact relationship between the upper and lower jaws, without impairing the merit of labor saving in the computer-aided (CAD/CAM) denture production.

A method for manufacturing a denture according to a first aspect of the present invention comprises:
  preparing an artificial tooth (1, 1A) and a denture base (3, 3A) provided with a concave socket (2, 2A) in which the artificial tooth (1, 1A) is embedded;
  applying an adhesive (12) to the socket (2, 2A); and
  embedding the artificial tooth (1,1A) in the socket (2, 2A) to which the adhesive (12) is applied,
  one or more grooves (9, 10, 13, 9A, 10A) are provided on at least one of a surface (5) of the artificial tooth (1, 1A) on the side embedded in the socket (2, 2A) and an inner surface (6) defining the socket (2, 2A),
  the one or more grooves (9, 10, 13, 9A, 10A) include a groove (9, 9A, 13) extending to the lingual side, and
  the embedding the artificial tooth (1, 1A) in the socket (2, 2A) includes
  forming a discharge hole (11, 11A) exposing an end (9a, 9b) side of the groove (9, 9A, 13) extending to the lingual side from the denture base (3, 3A) to discharge the adhesive (12), and
  discharging the adhesive (12) from the discharge hole (11, 11A).

In the method for manufacturing a denture according to a second aspect of the present invention,
  the preparing the artificial tooth (1, 1A) and the denture base (3, 3A) may include preparing the artificial tooth (1) provided with a first groove (9) and a second groove (10), the first groove (9) extending from a basal surface (7) to a lingual side surface (5a) of the artificial tooth (1), and the second groove (10) extending from the basal surface (7) to a buccal or labial side surface (5b) of the artificial tooth (1),
  an end (9a) of the first groove (9) extending on the lingual side surface (5a) may be located on a crown side relative to a cervical line (8) on the lingual side of the artificial tooth (1), and
  an end (10b) of the second groove (10) extending on the buccal or labial side surface (5b) may be located on a root side relative to the cervical line (8) on the buccal or labial side of the artificial tooth (1).

In the method for producing a denture according to a third aspect of the present invention,
  the preparing the artificial tooth (1, 1A) and the denture base (3, 3A) may include preparing the denture base (3A) provided with a third groove (9A) and a fourth groove (10A), the third groove (9A) extending from a concave bottom surface (6a) of the socket (2A) facing the basal surface (7) of the artificial tooth (1,1A) to a lingual concave side surface (6b), and a fourth groove (10A) extending from the concave bottom surface (6a) of the socket (2A) to a buccal or labial concave side surface (6c),
  an end (9b) of the third groove (9A) extending from the lingual concave side surface (6b) may reach a lingual outer surface (6d) of the denture base (3A), and
  an end (10b) of the fourth groove (10A) extending from the buccal or labial concave side surface (6c) may not reach a buccal or labial outer surface (6e) of the denture base (3A).

In the method for manufacturing a denture according to a fourth aspect of the present invention,
  a cross-sectional area of the one or more grooves (9, 10, 13, 9A, 10A) obtained by cutting in a direction orthogonal to an extending direction of the one or more grooves (9, 10, 13, 9A, 10A) may be 0.01 mm$^2$ or more and 10.0 mm$^2$ or less.

In the method for manufacturing a denture according to a fifth aspect of the present invention, the cross-sectional area of the one or more grooves (9, 10, 13, 9A, 10A) obtained by cutting in a direction orthogonal to an extending direction of the one or more grooves (9, 10, 13, 9A, 10A) may increase toward the lingual side.

In the method for manufacturing a denture according to a sixth aspect of the present invention,
  the preparing the artificial tooth (1, 1A) and the denture base (3, 3A) may include
  creating, by a computer, denture base design data (D3) of the denture base (3), and
  producing, by a producing device, the denture base (3) based on the denture base design data (D3), and
  when the denture base design data (D3) is created, the denture base design data (D3) provided with a concave socket (D2) may be created based on the artificial tooth shape data (D1) which is not provided with the first groove (9) and the second groove (10).

In the method for manufacturing a denture according to a seventh aspect of the present invention,
  the preparing the artificial tooth (1, 1A) and the denture base (3, 3A) may include
  creating, by a computer, denture base design data (D3A) of the denture base (3A), and
  producing, by a producing device, the denture base (3A) based on the denture base design data (D3A), and
  when the denture base design data (D3A) is created, the denture base design data (D3A) provided with a concave socket (D2) having the third groove (9A) and the fourth groove (10A) formed on an inner surface may be created based on the artificial tooth shape data (D1A) including a first convex portion (D15) and a second convex portion (D16) corresponding to the shapes of the third groove (9A) and the fourth groove (10A).

In the method for manufacturing a denture according to an eighth aspect of the present invention,
  the artificial tooth (1, 1A) may include at least two or more adjacent teeth out of a central incisor, a lateral incisor, a canine, a first premolar, a second premolar, a first molar, and a second molar.

In the method for manufacturing a denture according to a ninth aspect of the present invention,
  the basal surface (7) of the artificial tooth (1) may be provided with a continuous groove (14) continuously provided across at least two or more adjacent teeth,
  the one or more grooves (9, 10, 13) may be provided on the surface (5) of the artificial tooth (1), and the continuous groove (14) may communicate with the one or more grooves (9, 10, 13).

A denture according to a tenth aspect of the present invention comprises:
- an artificial tooth (1, 1A); and
- a denture base (3, 3A) provided with a concave socket (2, 2A) in which the artificial tooth (1, 1A) is embedded,
- one or more grooves (9, 10, 13, 9A, 10A) are provided on at least one of a surface (5) of the artificial tooth (1, 1A) on the side embedded in the socket (2, 2A) and an inner surface (6) defining the socket (2, 2A),
- the one or more grooves (9, 10, 13, 9A, 10A) include a groove (9, 9A, 13) extending to the lingual side,
- an end (9a,9b) side of the groove (9, 9A, 13) extending to the lingual side is exposed from the denture base (3, 3A), and
- the artificial tooth (1, 1A) and the denture base (3, 3A) are bonded and fixed by an adhesive (12) while the adhesive (12) is disposed in the one or more grooves (9, 10, 13, 9A, 10A).

In the denture of an eleventh aspect of the present invention,
- the one or more grooves (9, 10, 13) may include a first groove (9) and a second groove (10), the groove (9) extending from a basal surface (7) to a lingual side surface (5a) of the artificial tooth (1), and the second groove (10) extending from the basal surface (7) to a buccal or labial side surface (5b) of the artificial tooth (1),
- an end (9a) of the first groove (9) extending on the lingual side surface (5a) may be located on a crown side relative to a cervical line (8) on the lingual side of the artificial tooth (1), and
- an end (10b) of the second groove (10) extending on the buccal or labial, side surface (5b) may be located on a root side relative to the cervical line (8) on the buccal or labial side of the artificial tooth (1).

In the denture of a twelfth aspect of the present invention,
- the one or more grooves (9, 10, 13) may include a third groove (9A) and a fourth groove (10A), the third groove (9A) extending from a concave bottom surface (6a) of the socket (2A) facing the basal surface (7) of the artificial tooth (1,1A) to a lingual concave side surface (6b), and the fourth groove (10A) extending from the concave bottom surface (6a) of the socket (2A) to a buccal or labial concave side surface (6c),
- an end (9b) of the third groove (9A) extending from the lingual concave side surface (6b) may reach a lingual outer surface (6d) of the denture base (3A), and
- an end (10b) of the fourth groove (10A) extending from the buccal or labial concave side surface (6c) may not reach a buccal or labial outer surface (6e) of the denture base (3A).

In the denture of a thirteenth aspect of the present invention,
- the artificial tooth (1, 1A) may include at least two or more adjacent teeth out of a central incisor, a lateral incisor, a canine, a first premolar, a second premolar, a first molar, and a second molar.

In the denture of a fourteenth aspect of the present invention,
- the basal surface (7) of the artificial tooth (1) may be provided with a continuous groove (14) continuously provided across at least two or more adjacent teeth,
- the one or more grooves (9, 10, 13) may be provided on the surface (5) of the artificial tooth (1),
- the continuous groove (14) may communicate with the one or more grooves (9, 10, 13), and
- the adhesive (12) may be disposed in the continuous groove (14).

The present invention will now be described in detail with reference to the drawings. The drawings show the most effective examples for easy understanding; however, the present invention is not limited thereto.

FIG. 1 shows a frontal cross-sectional view of a typical example of a denture 20. The denture 20 includes an artificial tooth 1 and a denture base 3 provided with a socket 2 into which the artificial tooth 1 is embedded. The socket 2 is provided with a space 4 for an adhesive 12. The space 4 is a gap disposed in consideration of a fitting tolerance between the artificial tooth 1 and the denture base 3. In the figure, the left side of the denture 20 shows the buccal side, and the right side shows the lingual side. In the example shown in FIG. 1, a molar tooth is described as the artificial tooth 1. The material of the adhesive 12 is not particularly limited and may be known adhesives or acrylic-based auto-polymerizing resins, and if the denture base 3 is shaped with a 3D printer etc. liquid materials thereof can also be used.

In the denture 20, a groove 9 extending from a basal surface 7 of the artificial tooth 1 to above a cervical line 8 on the lingual side and a groove 10 extending from the basal surface 7 of the artificial tooth 1 to below the cervical line 8 on the labial or buccal side is disposed on a surface 5 of an embedded portion of the artificial tooth 1. However, the present invention is not limited thereto, and the grooves 9, 10 may be disposed on an inner surface 6 of the socket 2 of the denture base 3 or on both. In this description, the groove 9 may be referred to as a "first groove 9", and the groove 10 may be referred to as a "second groove 10".

The surface 5 of the embedded portion of the artificial tooth 1 means a surface of the artificial tooth 1 on the side arranged in the socket 2. For example, the surface 5 is a surface of the artificial tooth 1 facing the inner surface 6 of the socket 2 and has the basal surface 7 and side surfaces 5a, 5b of the artificial tooth 1 when the denture 20 is viewed from the side. The side surface 5a is the lingual side surface of the artificial tooth 1, and the side surface 5b is the buccal side surface of the artificial tooth 1. The cervical line 8 means a boundary line between a crown and a root of the artificial tooth 1. For example, the cervical line 8 may indicate the depth at which the artificial tooth 1 is embedded in the socket 2.

The shape, material, and manufacturing means of the artificial tooth 1 are not particularly limited, and those of a known technique may be used. For example, the artificial tooth may be a ready-made artificial tooth made of acrylic resin mass-produced by molds, or an artificial tooth designed into a shape meeting the individual needs of patients by using dental CAD/CAM technology and subjected to cutting or laminate molding. The shape of the artificial tooth 1 may be formed by single teeth such that respective teeth are independent, or two or more teeth may be coupled. For example, the artificial tooth 1 includes at least one of a central incisor, a lateral incisor, a canine, a first premolar, a second premolar, a first molar, and a second molar.

The denture base 3 is a base on which the artificial tooth 1 is arranged. The socket 2 for embedding the artificial tooth 1 is formed in the denture base 3. The material of the denture base 3 is not particularly limited, and those of a known technique such as PMMA (polymethylmethacrylate), PC (polycarbonate), and PA (polyamide) may be used.

The socket 2 is a concave portion recessed on the surface of the denture base 3. A base of the artificial tooth 1 is inserted in the socket 2. The base of the artificial tooth 1 is a portion of the artificial tooth 1 on the basal surface 7 side, and is a portion bonded to the denture base 3. The socket 2 is formed in a concave shape in accordance with the outer shape of the base of the artificial tooth 1. Therefore, the socket 2 is formed in a recessed manner in a concave shape surrounding at least a part of the base of the artificial tooth 1. The socket 2 is formed along the arrangement direction of the artificial teeth 1.

The artificial tooth 1 is bonded and fixed to the denture base 3 by the adhesive 12. The adhesive 12 is disposed in the space 4 between the surface 5 of the artificial tooth 1 and the inner surface 6 of the socket 2.

In the example shown in FIG. 1, the grooves 9, 10 are provided on the basal surface 7 side of the artificial tooth 1. The groove 9 is formed on the basal surface 7 of the artificial tooth 1 and the lingual side surface 5a of the artificial tooth 1. Specifically, the groove 9 extends from near the center of the artificial tooth 1 toward the lingual side on the basal surface 7 and extends on the lingual side surface 5a of the artificial tooth 1 toward the cusp side (crown side) when viewed from the side of the artificial tooth 1. For example, the groove 9 is linearly formed from near the center of the artificial tooth 1 toward the lingual side. An end 9a side of the groove 9 formed on the lingual side surface 5a of the artificial tooth 1 is exposed from the denture base 3. Specifically, the end 9a of the groove 9 formed on the lingual side surface 5a of the artificial tooth 1 is located on the crown side of the artificial tooth 1 relative to the cervical line 8. The cervical line 8 is a line indicative of the height of the artificial tooth 1 embedded in the socket 2. Therefore, the distance from the basal surface 7 of the artificial tooth 1 to the end 9a of the groove 9 on the lingual side surface 5a of the artificial tooth 1 is greater than the depth of the socket 2. As a result, while the artificial tooth 1 is embedded in the socket 2, the end 9a side of the groove 9 is exposed from the denture base 3 to form the discharge hole 11. When the artificial tooth 1 is adhesively fixed to the socket 2, the discharge hole 11 discharges the excess adhesive 12 disposed between the surface 5 of the artificial tooth 1 and the inner surface 6 of the socket 2. The size of the discharge hole 11 is not particularly limited and, however, has an opening area of 0.01 mm$^2$ or more and 10.0 mm$^2$ or less, preferably 0.1 mm$^2$ or more and 4.0 mm$^2$ or less.

The groove 10 is formed on the basal surface 7 of the artificial tooth 1 and the buccal side surface 5b of the artificial tooth 1. Specifically, the groove 10 extends from the center of the artificial tooth 1 toward the buccal side on the basal surface 7 and extends on the buccal side surface 5b of the artificial tooth toward the cusp side (the crown side), when viewed from the side of the artificial tooth 1. For example, the groove 10 is linearly formed from near the center of the artificial tooth 1 toward the buccal side. The groove 10 is not exposed from the denture base 3. Specifically, an end 10a of the groove 10 formed on the buccal side surface 5b of the artificial tooth 1 is located on the root side of the artificial tooth 1 relative to the cervical line 8 and is not located on the crown side of the artificial tooth 1 relative to the cervical line 8. Therefore, the distance from the basal surface 7 of the artificial tooth 1 to the end 10a of the groove 10 on the buccal side surface 5b of the artificial tooth 1 is less than the depth of the socket 2. As a result, the groove 10 is not exposed from the denture base 3 while the artificial tooth 1 is embedded in the socket 2.

Cross-sectional areas of the groove 9 and the groove 10 are 0.01 mm$^2$ or more and 10.0 mm$^2$ or less, preferably 0.1 mm$^2$ or more and 4.0 mm$^2$ or less. The cross-sectional areas of the groove 9 and the groove 10 mean areas of cross sections obtained by cutting in the direction orthogonal to the extending direction of the groove 9 and the groove 10. The shape of the cross section of the groove 9 and the groove 10 is not particularly limited and may be, for example, a semicircle, an ellipse, a trapezoid, or a triangle. The grooves 9, 10 allow the adhesive 12 to easily flow in the lingual direction, or in the labial or buccal direction, so that the filling amount can be controlled without excess or deficiency. Although the grooves 9, 10 are linearly formed in the example described above, the present invention is not limited thereto. For example, the grooves 9, 10 may be formed in a curved shape. The cross-sectional areas of the groove 9 and the groove 10 may vary in the extending direction of the groove 9 and the groove 10. For example, the cross-sectional areas of the groove 9 and the groove 10 may increase from the buccal side to the lingual side. Alternatively, the cross-sectional areas of the groove 9 and the groove 10 may be constant.

In the example shown in FIG. 1, to show the basic requirements, the groove 9 and the groove 10 are shown as respective independent grooves; however, the present invention is not limited thereto. As described later with reference to FIG. 2, one groove may be formed to extend from above the cervical line 8 on the lingual side to below the cervical line 8 on the labial or buccal side via the basal surface 7. Therefore, the groove 9 and the groove 10 may be connected to form one groove.

Figure 2:
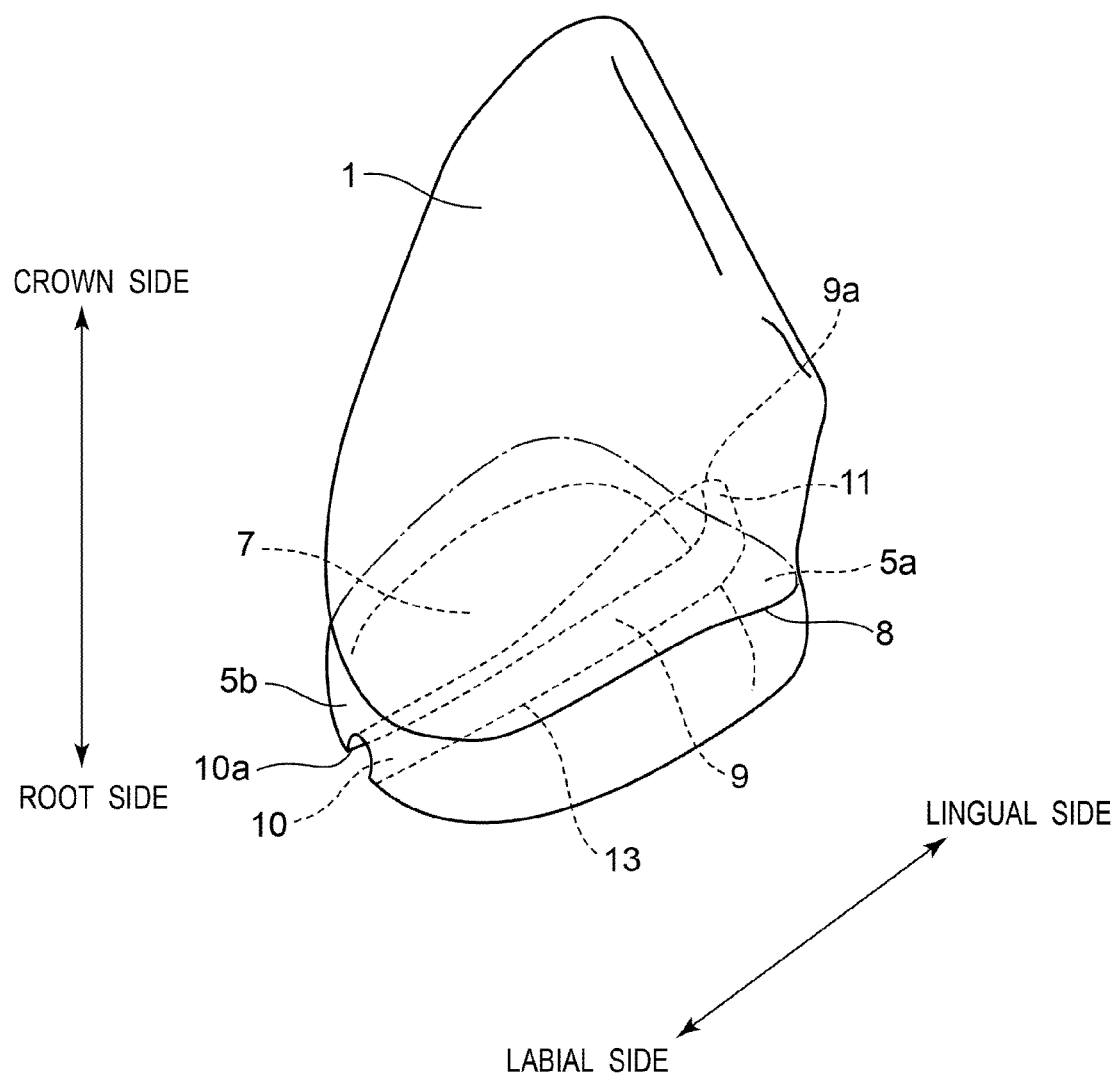
FIG. 2 is a perspective view of an artificial tooth (second embodiment)

FIG. 2 shows an example of the artificial tooth 1 in the denture 20. In the example shown in FIG. 2, the artificial tooth 1 is a canine. In the example shown in FIG. 2, the groove 9 extending from the basal surface 7 to above the cervical line 8 on the lingual side and the groove 10 extending from the basal surface 7 to below the cervical line 8 on the labial or buccal side are formed by one groove 13. Therefore, the groove 13 extends from above the cervical line 8 on the lingual side to below the cervical line 8 on the labial or buccal side via the basal surface 7. However, the present invention is not limited thereto and may be respective independent grooves.

Explaining in detail, in the example shown in FIG. 2, the one groove 13 is formed by integrally forming the groove 9 and the groove 10. The groove 13 is continuously disposed on the basal surface 7 of the artificial tooth 1 from the labial side surface 5b toward the lingual side surface 5a of the artificial tooth 1. For example, the groove 13 is linearly formed from the labial side surface 5b to the lingual side surface 5a of the artificial tooth 1 on the basal surface 7 of the artificial tooth 1. The cross-sectional area of the groove 13 varies from the labial side surface 5b toward the lingual side surface 5a of the artificial tooth 1. In this case, the cross-sectional area of the groove 13 means an area of the cross section obtained by cutting in the direction orthogonal to the extending direction of the groove 13. For example, the cross-sectional area of the groove 13 may continuously be increased from the labial side surface 5b toward the lingual side surface 5a of the artificial tooth 1 or may be increased stepwise. This makes it easier for the adhesive 12 to flow to the lingual side. The cross-sectional area of the groove 13 is 0.01 mm$^2$ or more and 10.0 mm$^2$ or less, preferably 0.1 mm$^2$ or more and 4.0 mm$^2$ or less. The shape of the cross section of the groove 13 is not particularly limited, and may be, for example, a semicircle, an ellipse, a trapezoid, or a triangle.

Figure 3A:
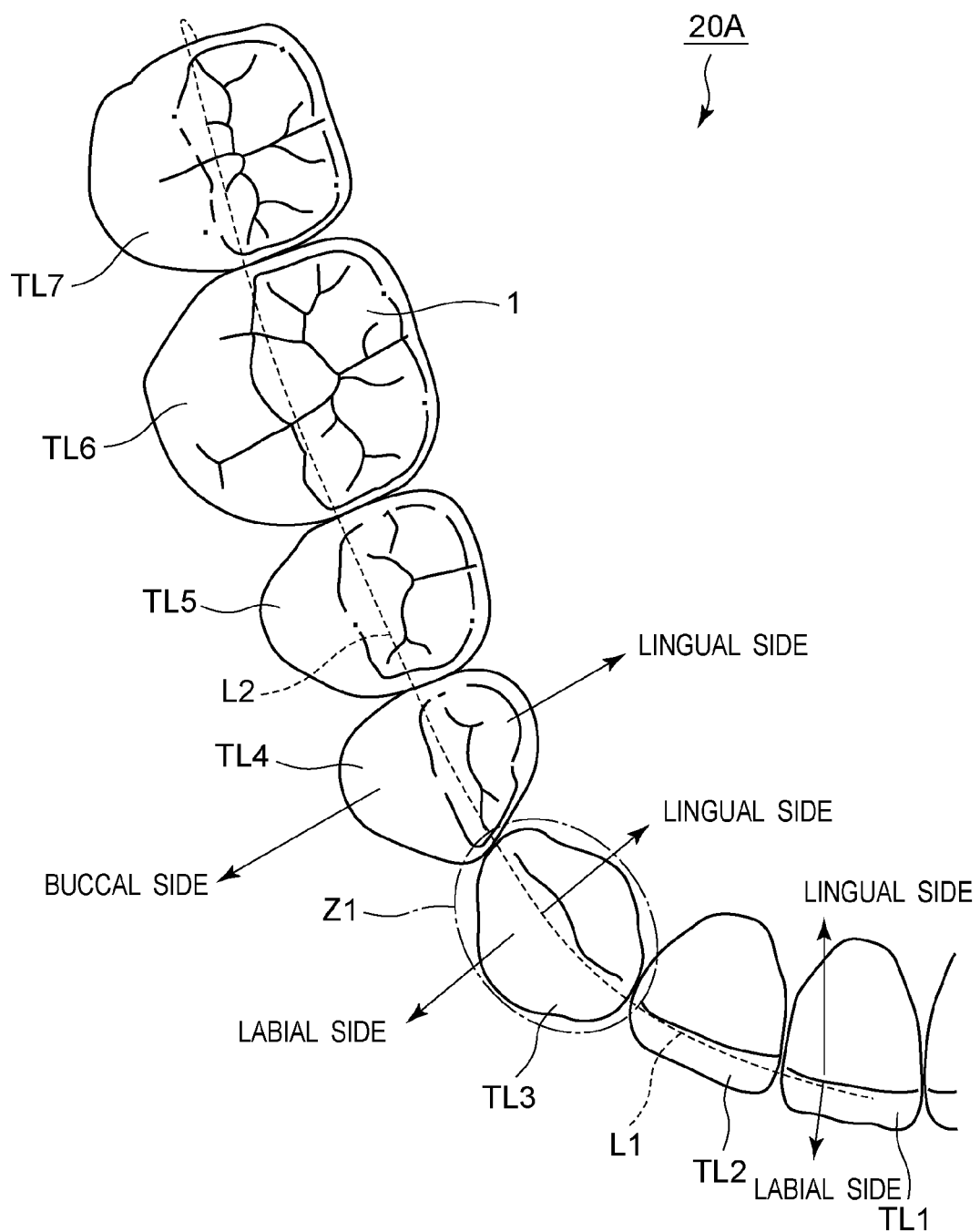
FIG. 3a is an occlusal surface view on the right side of an artificial tooth portion of a mandibular denture.

FIG. 3a is an occlusal surface view of the right side of an artificial tooth portion of an exemplary mandibular denture 20A, and FIG. 3b shows an enlarged view of a mandibular canine TL3 shown in a Z1 portion of FIG. 3a as viewed from the basal surface 7 side. The mandibular denture 20A shown in FIG. 3a has a mandibular central incisor TL1, a mandibular lateral incisor TL2, a mandibular canine TL3, a mandibular first premolar TL4, a mandibular second premolar TL5, a mandibular first molar TL6, and a mandibular second molar TL7 on each of the left and right sides. The Mandibular central incisor TL1, the mandibular lateral incisor TL2, the mandibular canine TL3, the mandibular first premolar TL4, the mandibular second premolar TL5, the mandibular first molar TL6, and the mandibular second molar TL7 are arranged in a tooth arch shape, i.e., in a U shape. The mandibular central incisor TL1, the mandibular lateral incisor TL2, and the mandibular canine TL3 are included in a front tooth, and the mandibular first premolar TL4, the mandibular second premolar TL5, the mandibular first molar TL6, and the mandibular second molar TL7 are included in a molar tooth.

As shown in FIG. 3a, the labial side refers to the side where the front tooth appears to the outside when the mouth is opened, and the buccal side refers to the side where the molar tooth contacts the buccal mucosa in the oral cavity, both of which refer to the outside of the dental arch. The lingual side is the side coming into contact with the tongue and refers to the inside the dental arch. In this description, for convenience, to clearly define the range of the grooves 9, 10 provided in the artificial tooth 1 or the socket 2 in the extending direction, the labial side refers to the entire region on the side appearing to the outside at the time of opening of the mouth when an incisal edge dividing the front tooth into two in the labial-lingual direction is defined as a boundary line L1. The buccal side refers to the region on the side appearing to the outside at the time of opening of the mouth when an occlusal edge connecting the buccal cusps of the molars is defined as a boundary line L2. The lingual side refers to the region on the side bring into contact with the tongue from the boundary lines L1, L2 of the front tooth and the molar tooth. Although the side corresponding to the lingual side of the lower jaw is usually referred to as the palatal side in the upper jaw, this side is also referred to as the lingual side in this description.

In the example of the mandibular canine TL3 of FIG. 3b, the groove 9 on the lingual side of the mandibular canine TL3 is provided on the distal side. The groove 9 extending from the center of the basal surface 7 of the mandibular canine TL3 to the side surface 5a on the lingual side extends in the direction intersecting with the boundary line L1 on the distal side of the mandibular canine TL3. Specifically, the extending direction A1 of the groove 9 is directed toward the distal side relative to the direction orthogonal to the boundary line L1 at the center of the basal surface 7 of the mandibular canine TL3. As a result, the discharge hole 11 for the adhesive 12 becomes inconspicuous in appearance on the lingual side. The groove 10 is also directed toward the distal side on the labial side of the mandibular canine TL3. The groove 10 extending from the center of the basal surface 7 to the side surface 5b on the labial side extends in the direction intersecting with the boundary line L1 on the distal side of the mandibular canine TL3. Specifically, the extending direction A2 of the groove 10 is directed toward the distal side relative to the direction orthogonal to the boundary line L1 at the center of the basal surface 7 of the mandibular canine TL3. As a result, when a denture base having transparency is used, the side surface 5b of the mandibular canine TL3 can be prevented from appearing to be chipped at the groove 10 when the denture is viewed from the front, so that the denture excellent in aesthetics can be manufactured. The extending directions A1, A2 of the grooves 9, 10 shown in FIG. 3b are examples and are not limited thereto. For example, the extending directions A1, A2 of the groove 9 and the groove 10 may be parallel to the frontal cross section from the basal surface 7 or may be parallel to the sagittal cross section. In FIG. 3b, an example of the mandibular canine 3b has been described; however, the present invention is not limited thereto. The configuration shown in FIG. 3b may be applied, to other artificial teeth.

Figure 4:
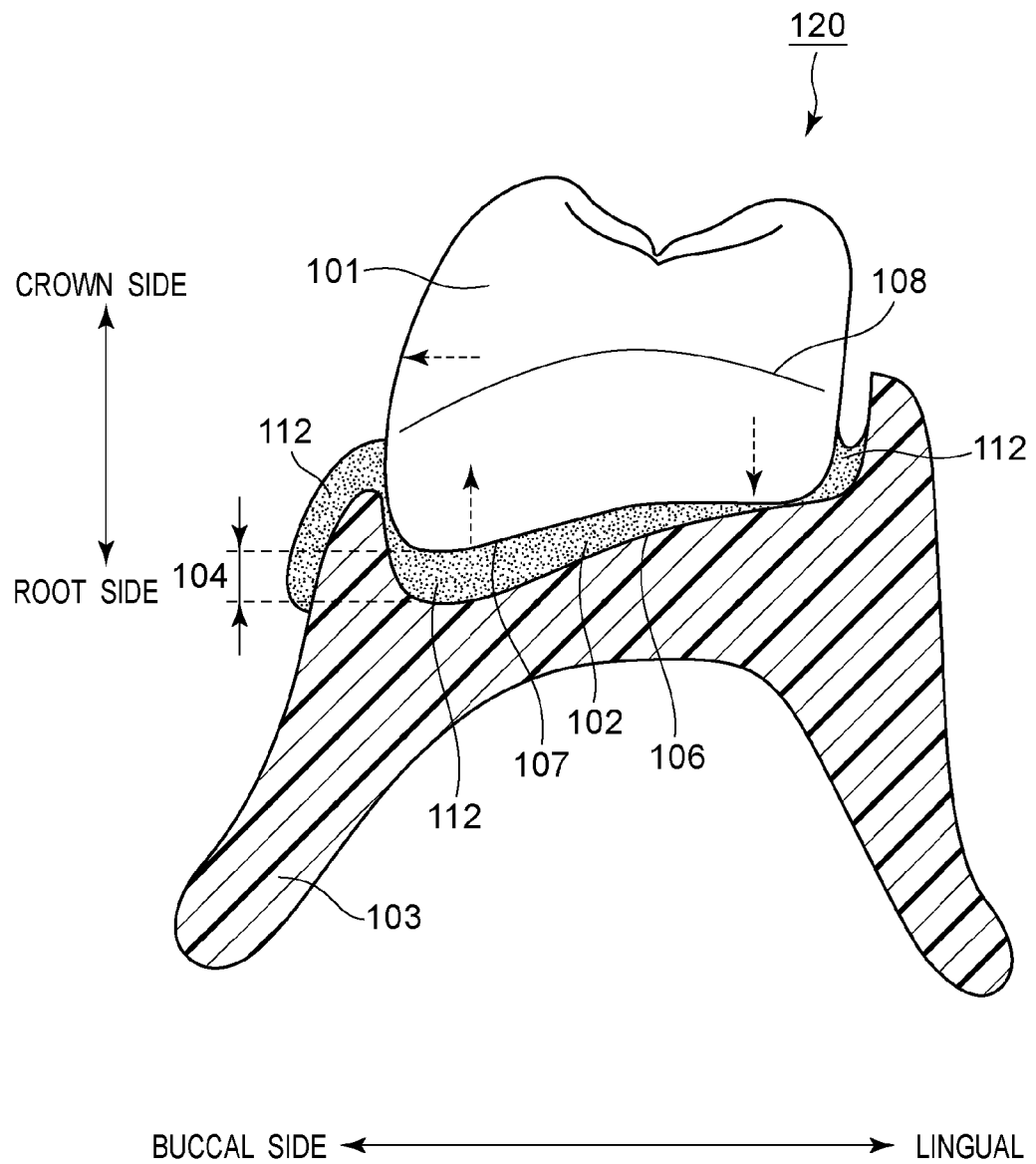
FIG. 4 is a frontal cross-sectional view of a denture (known technical form)

FIG. 4 shows a frontal cross section as an example in which a space 104 of an adhesive 112 becomes uneven between the lingual side and the buccal side when the adhesive 112 etc. are applied to an inner surface 106 of a socket 102 and an artificial tooth 101 is embedded in a denture 100 manufactured by using a known CAD/CAM technique. A broken line arrow in the figure indicates a direction in which the artificial tooth 101 deviates from an original embedding position. According to a known technique, the space 104 of the adhesive 112 is disposed between the socket 102 and the artificial tooth 101.

However, it is practically impossible to manually regulate the amount of the adhesive 112 and accurately fix the artificial tooth 101 to the center position of the socket 102, and the artificial tooth 101 has to be fixed along the partition wall on the buccal or lingual side as shown in FIG. 4. As a result, the space 104 of the adhesive 112 becomes uneven between the lingual side and the buccal side.

As shown in FIG. 4, when the artificial tooth 101 is embedded in the socket 102 on the buccal side relative to a designed target position, the space 104 of the adhesive 112 is thinner than expected on the buccal crown axial surface, and therefore, the filling amount of the adhesive 112 becomes excessive. As a result, the adhesive 112 may leak beyond the socket 102 on the buccal side surface and require a wipe-off work, and a coating of the adhesive 112 is increased on the basal surface 107 of the artificial tooth 101 so that the occlusal height becomes higher. On the other hand, on the lingual side, the amount of the adhesive 112 disposed in the space between the artificial tooth 101 and the socket 102 is insufficient, while the adhesive 112 is not filled to the height of the cervical line 108 on the lingual crown axial surface, and a periodontal pocket-shaped cavity is highly likely to be formed. In such a case, a complicated work of additionally filling the adhesive 112 is performed, or if the denture is completed without additionally filling the adhesive 112, a plaque nest is formed, resulting in an unsanitary denture. Additionally, the coating of the adhesive 112 becomes thin on the basal surface 107, and the occlusal height becomes lower, so that a designed occlusal contact cannot be established. Since the space 104 of the adhesive 112 has an interrupted portion between the buccal side and the lingual side on the basal surface 107, it is difficult to allow the adhesive 112 to flow from the narrow side to the wide side of the space 104.

Therefore, in the example shown in FIG. 4, the two-dimensional unevenness at the time of embedding of the artificial tooth 101 develops into a three-dimensional unevenness, which promotes a complexity of the denture production process, and affects hygienic and functional qualities. In the example shown in FIG. 4, the artificial tooth 101 is biased toward the buccal side on the inner surface 106 of the socket 102; however, the same can be applied to when, the artificial tooth 101 is biased toward the lingual side.

Figure 5:
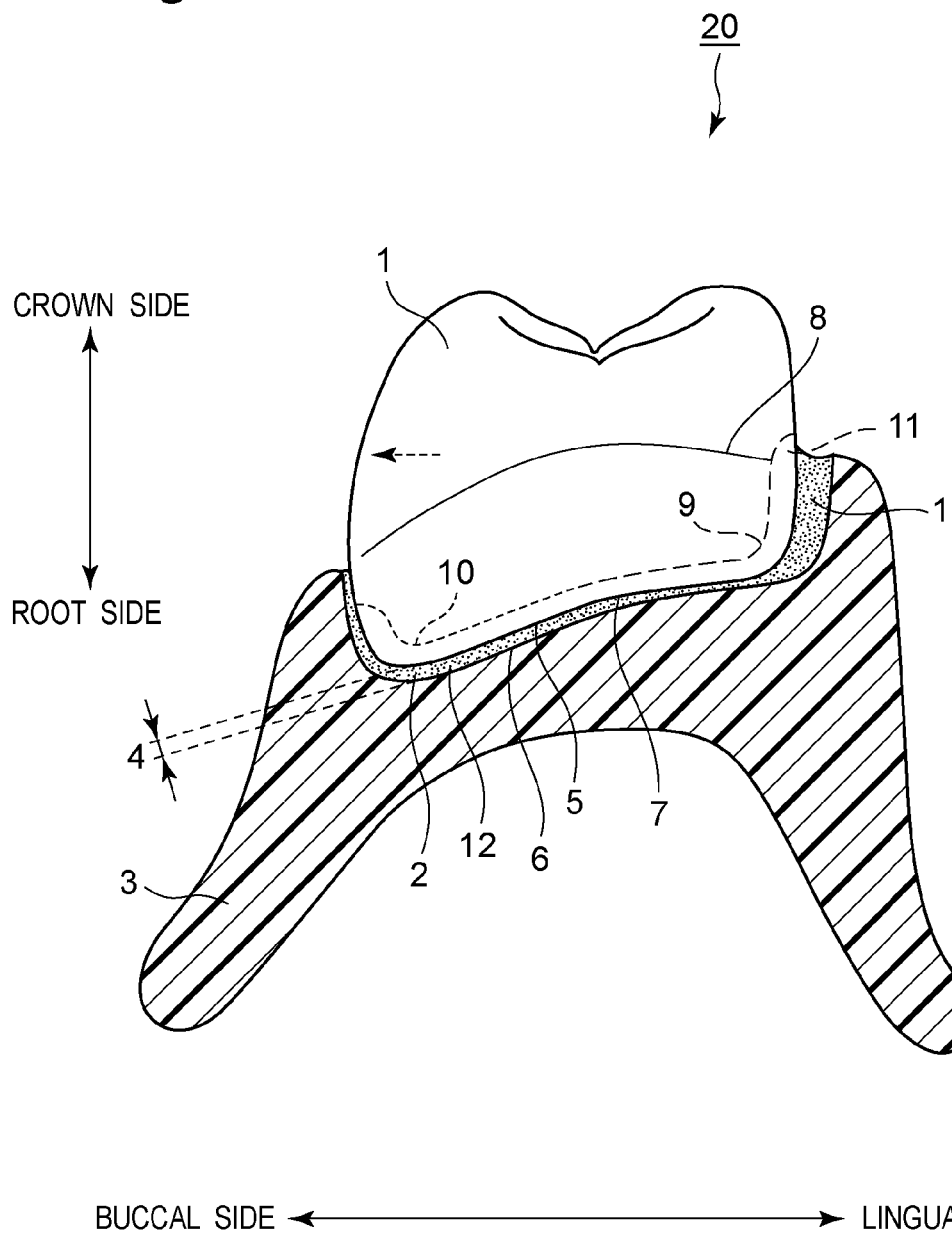
FIG. 5 is a frontal cross-sectional view of a denture (fourth embodiment)

FIG. 5 shows a frontal cross section of an exemplary denture 20. In the example shown in FIG. 5, the artificial tooth 1 is embedded in the socket 2 on the buccal side. A broken line arrow in the figure indicates the direction in which the artificial tooth 1 deviates from the designed embedding position due to the unevenness of the space 4. In the example shown in FIG. 5, the surface 5 of the artificial tooth 1 is provided with the groove 9 extending to above the cervical line 8 on the lingual side and the groove 10 extending to below the cervical line 8 on the labial or buccal side. As a result, the adhesive 12 can easily flow in the lingual direction or the labial or buccal direction through the grooves 9, 10, so that the excess or deficiency of the filling amount can be controlled. Furthermore, the groove 10 extends to below the cervical line 8 on the labial or buccal side, while the groove 9 is opened above the cervical line 8 on the lingual side to form the discharge hole 11, and therefore, the excess adhesive 12 is discharged on the lingual side, so that the complexity of the work of wiping off the adhesive 12 can be reduced.

Figure 6:
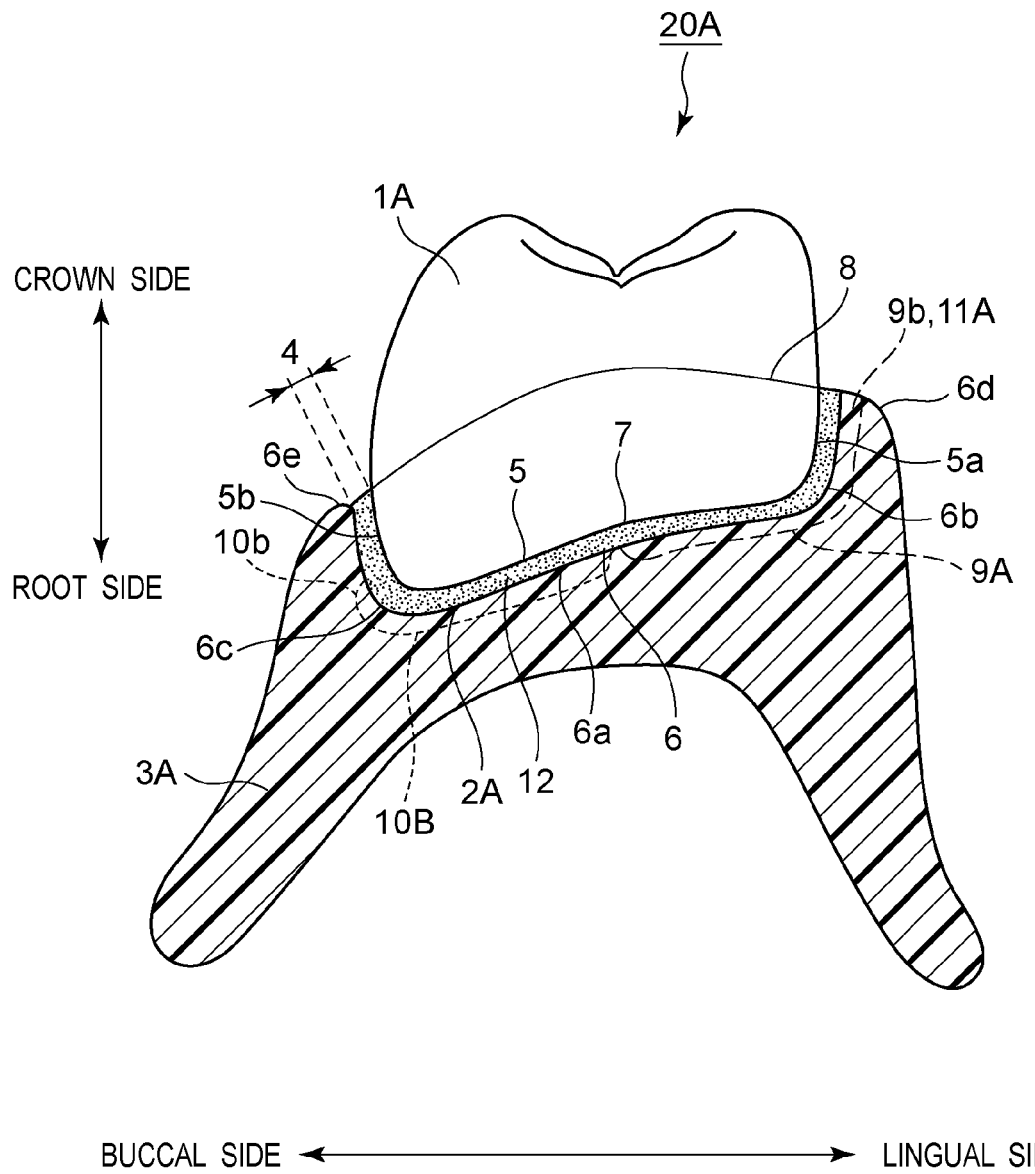
FIG. 6 is a frontal cross-sectional view of a denture (fifth embodiment)

FIG. 6 shows an example in which a groove 9A and a groove 10A are provided on an inner surface 6 of a socket 2A of a denture base 3A in a denture 20A. In the example shown in FIG. 6, the inner surface 6 of the socket 2A of the denture base 3A includes the groove 9A exposed to the outside of the denture base 3, and the groove 10A extending to below the cervical line 8 on the labial or buccal side, from the basal surface 7 of an artificial tooth 1A. As described above, the two grooves 9A, 10A may be independent from each other or may be integrated. In this description, the groove 9A may be referred to as a "third groove 9A", and the groove 10A may be referred to as a "fourth groove 10A".

In the configuration of the denture 20, the artificial tooth 1 provided with the grooves 9, 10 shown in FIG. 1 and the denture base 3A including the socket 2A provided with the grooves 9A, 10A shown in FIG. 5 may be combined. In each case, the effect is the same, and the adhesive 12 can easily flow in the lingual direction, or in the labial or buccal direction through the grooves 9, 10, 9A, 10A, so that the excess or deficiency of the filling amount can be controlled.

More specifically, in the example shown in FIG. 6, the denture 20A includes the artificial tooth 1A and the denture base 3A provided with the concave socket 2A in which the artificial tooth 1A is embedded. The artificial tooth 1A is not provided with grooves 9, 10 on the surface 5. For example, a ready-made artificial tooth can be used as the artificial tooth 1A. The denture base 3A is provided with the third groove 9A and the fourth groove 10A on the inner surface 6 defining the socket 2A. The third groove 9A extends from a concave bottom surface 6a of the socket 2A facing the basal surface 7 of the artificial tooth 1A to a lingual concave side surface 6b. The fourth groove 10A extends from the concave bottom surface 6a of the socket 2A to the buccal concave side surface 6c. An end 9b of the third groove 9A extending on the lingual concave side surface 6b reaches a lingual outer surface 6d of the denture base 3A. As a result, the end 9b of the third groove 9A is exposed from the denture base 3A to form a discharge hole 11A. An end 10b of the fourth groove 10A extending on the buccal concave side surface 6c does not reach a buccal outer surface 6e of the denture base 3A.

For example, the third groove 9A and the fourth groove 10A are linearly formed. Cross-sectional areas of the third groove 9A and the fourth groove 10A are 0.01 mm$^2$ or more and 10.0 mm$^2$ or less, preferably 0.1 mm$^2$ or more and 4.0 mm$^2$ or less. The cross-sectional areas of the third groove 9A and the fourth groove 10A mean areas of cross sections obtained by cutting in the direction orthogonal to the extending direction of the third groove 9A and the fourth groove 10A. The shape of the cross section of the third groove 9A and the fourth groove 10A is not particularly limited and may be, for example, a semicircle, an ellipse, a trapezoid, or a triangle. The third groove 9A and the fourth groove 10A allow the adhesive 12 to easily flow in the lingual direction, or in the labial or buccal direction, so that the filling amount can be controlled without excess or deficiency. Although the third groove 9A and the fourth groove 10A are linearly formed in the example described above, the present invention is not limited thereto. For example, the third groove 9A and the fourth groove 10A may be formed in a curved shape. The cross-sectional areas of the third groove 9A and the fourth groove 10A may vary in the extending direction of the third groove 9A and the fourth groove 10A or may be constant. For example, the cross-sectional areas of the third groove 9A and the fourth groove 10A may increase continuously or stepwise toward the lingual side.

Figure 7:
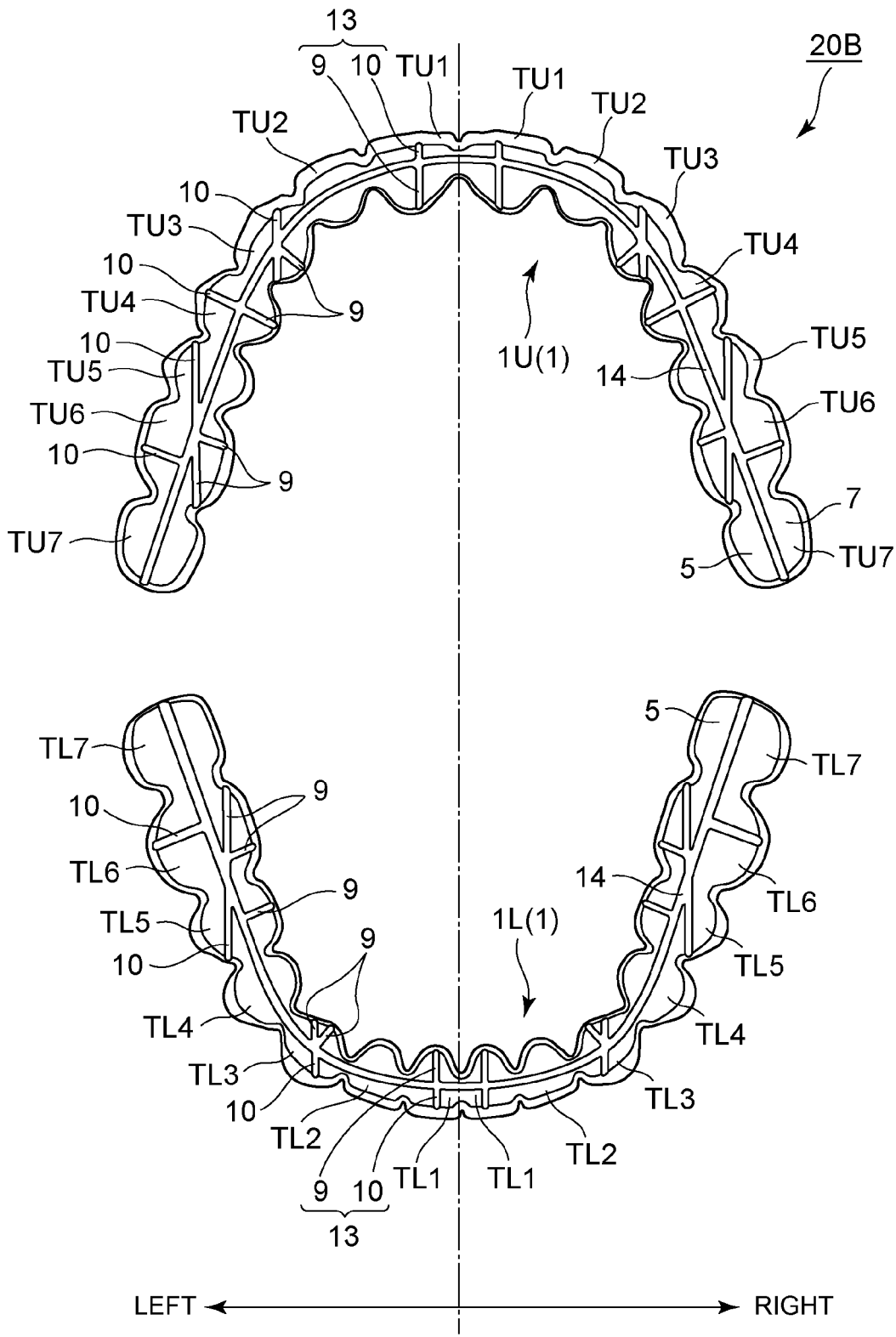
FIG. 7 is a basal surface view of coupled artificial teeth.

FIG. 7 shows an example of the artificial teeth 1 attached to a denture 20B as viewed from the basal surface 7. An upper side shows the upper jaw, and a lower side shows the lower jaw. In this case, the artificial tooth 1 has at least two or more adjacent teeth connected out of 14 teeth, i.e., central incisors, lateral, incisors, canines, first premolars, second premolars, first molars, and second molars on the left and right sides. In the example shown in FIG. 7, the surface 5 of the embedded portion of the artificial tooth 1 is provided with the groove 9 extending from the basal surface 7 of the artificial tooth 1 to above the cervical line 8 on the lingual side and the groove 10 extending from the basal surface 7 of the artificial tooth 1 to below the cervical line 8 on the labial or buccal side. As described with reference to FIG. 3, the groove 9 and the groove 10 are not limited to the example in which the grooves each extend in the direction intersecting with the boundary line L1 on the distal side and may be disposed in a direction parallel to the frontal cross section from the basal surface 7 or may be disposed in a direction parallel to the sagittal cross section. By using the artificial tooth 1 in which two or more teeth are connected, a partition wall for each tooth is eliminated in the socket 2, so that the application amount of the adhesive 12 can evenly be dispersed. As a result, since a deviation of the occlusal height can be controlled, an error due to the excess adhesive 12 can be reduced, in addition to the discharge effect of the groove 9 extending to above the cervical line 8 on the lingual side.

Specifically, the denture 20B includes a maxillary artificial tooth 1U and a mandibular artificial tooth 1L. The maxillary artificial tooth 1U has a maxillary central incisor TU1, a maxillary lateral incisor TU2, a maxillary canine TU3, a maxillary first premolar TU4, a maxillary second premolar TU5, a maxillary first molar TU6, and a maxillary second molar TU7 from the center on each of the left and right sides. The maxillary central incisor TU1, the maxillary lateral incisor TU2, the maxillary canine TU3, the maxillary first premolar TU4, the maxillary second premolar TU5, the maxillary first molar TU6, and the maxillary second molar TU7 are arranged in a tooth arch shape, i.e., in a U shape, when viewed from the basal surface 7 side. The maxillary artificial tooth 1U is provided with a continuous groove 14 formed over the basal surface 7 of the maxillary central incisor TU1, the maxillary lateral incisor TU2, the maxillary canine TU3, the maxillary first premolar TU4, the maxillary second premolar TU5, the maxillary first molar TU6, and the maxillary second molar TU7. The groove 14 is formed in a U shape when viewed from the basal surface 7 side. The grooves 9, 10 communicate with the groove 14. In the example shown in FIG. 7, the grooves 9, 10 are provided in the maxillary middle incisor TU1, the maxillary canine TU3, the maxillary first premolar TU4, the maxillary second premolar TU5, and the maxillary first molar TU6 and are not provided in the maxillary lateral incisor TU2 and the maxillary second molar TU7.

The mandibular artificial teeth 1L has the mandibular central incisor TL1, the mandibular lateral incisor TL2, the mandibular canine TL3, the mandibular first premolar TL4, the mandibular second premolar TL5, and the mandibular first molar TL6, and the mandibular second molar TL7 from the center on each of the left and right sides. The mandibular central incisor TL1, the mandibular lateral incisor TL2, the mandibular canine TL3, the mandibular first premolar TL4, the mandibular second premolar TL5, the mandibular first molar TL6, and mandibular second molar TL7 are arranged in a tooth arch shape, i.e., in a U shape, when viewed from the basal surface 7 side. The mandibular artificial tooth 1L is provided with a continuous groove 14 formed over the basal surface 7 of the mandibular central incisor TL1, the mandibular lateral incisor TL2, the mandibular canine TL3, the mandibular first premolar TL4, the mandibular second premolar TL5, the mandibular first premolar TL6, and the mandibular second molar TL7. The groove 14 is formed in a U shape when viewed from the basal surface 7 side. The grooves 9, 10 communicate with the groove 14. In the example shown in FIG. 7, the grooves 9, 10 are provided in the mandibular middle incisor TL1, the mandibular canine TL3, the mandibular first premolar TL4, the mandibular second premolar TL5, and the mandibular first molar TL6 and are not disposed in the mandibular lateral incisor TL2 and the mandibular second molar TL7.

Figure 8A:
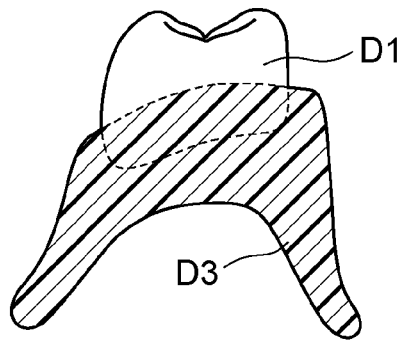
FIG. 8a is a conceptual diagram of a denture design process program.
Figure 8B:
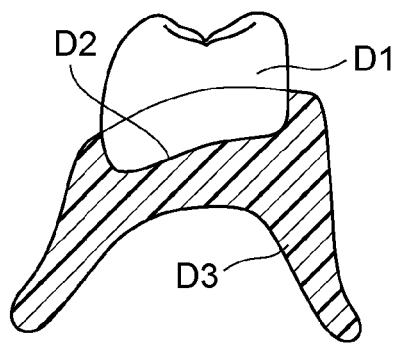
FIG. 8b is a conceptual diagram of the denture design process program.
Figure 8C:
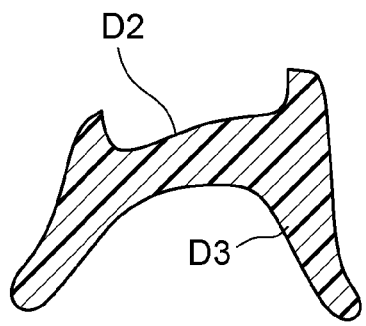
FIG. 8c is a conceptual diagram of the denture design process program.
Figure 8D:
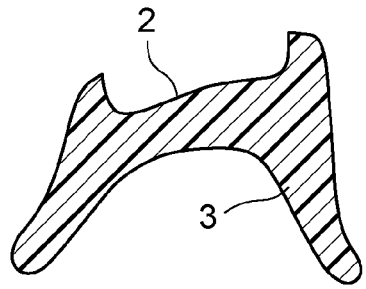
FIG. 8d is a conceptual diagram of the denture design process program.
Figure 8E:
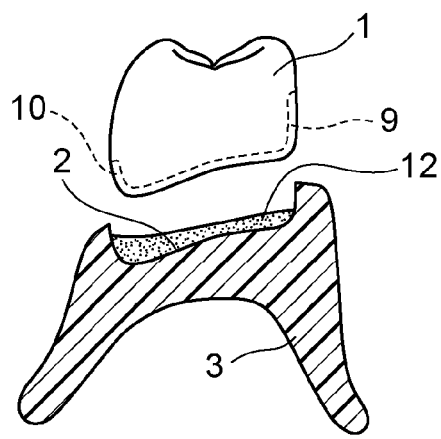
FIG. 8e is a conceptual diagram of the denture design process program.
Figure 8F:
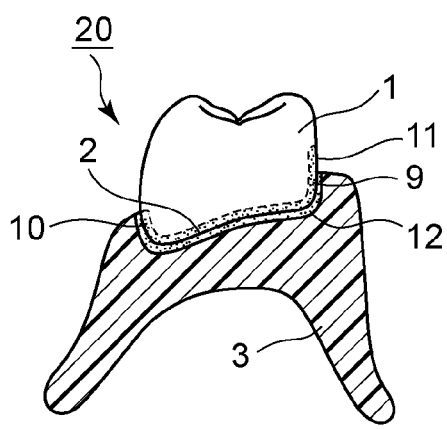
FIG. 8f is a conceptual diagram of the denture design process program.

FIGS. 8a to 8f are conceptual diagrams of an exemplary method for producing the denture 20. FIGS. 8a to 8f show an example of a process in which the grooves 9, 10 and the discharge hole 11 are formed by creating virtual shape data D3 of the denture base 3 based on a computer-aided design program forming a socket D2 by deleting a gingival portion of the virtual shape data D3 of the denture base 3 by using virtual shape data D1 of an artificial tooth not including the groove 9 extending to above the cervical line 8 on the lingual side and the groove 10 extending to below the cervical line 8 on the labial or buccal side, producing the denture base 3 based on the virtual shape data D3, and embedding the artificial tooth 1 including the grooves 9, 10 in the socket 2 of the denture base 3. FIGS. 8a to 8c show a design process by the computer-aided design program (CAD), FIG. 8d shows a production process by a computer-aided manufacturing system (CAM), and FIGS. 8e and 8f show a denture assembly process.

First, as shown in FIG. 8a, for an artificial tooth arrangement and gingival formation process in the computer-aided design program, a shape of the oral mucosa of the patient's upper and lower jaws and a shape of a biteplate etc. recording their relative positional relationship are read into a virtual space to perform artificial tooth arrangement and gingival formation. At this stage, the groove 9 and the groove 10 are not included in the virtual shape data D1 of the artificial tooth.

Subsequently, as shown in FIG. 8b, for a socket forming process, the virtual shape data D1 of the artificial tooth is subtracted and deleted from the gingival portion of the virtual shape data D3 of the denture base 3. Since the virtual shape data D1 of the artificial tooth does not include the grooves 9, 10, the socket D2 has a shape without a groove. Finally, as shown in FIG. 8c, the three-dimensional shape data D3 of the denture base 3 provided with the socket D2 is output to the computer-aided manufacturing system (CAM). The format of the data is not particularly limited and a known format can be used. Generally, the STL format is used.

Subsequently, as shown in FIG. 8d, for a denture base production process, the denture base 3 is produced by the computer-aided manufacturing system (CAM) from the three-dimensional shape data D3 of the denture base 3. A known technique can be used for the production process of the denture base 3 by the computer-aided manufacturing system (CAM) and, for example, a known technique such as a milling method using an NC cutting machine or a laminated molding method using a 3D printer etc. can be used.

Subsequently, as shown in FIG. 8e, the adhesive 12 is applied to the socket 2 of the denture base 3, and the artificial tooth 1 is embedded. The artificial tooth 1 is different from the virtual shape data D1 of the computer-aided design program, and the artificial tooth 1 including the grooves 9, 10 is embedded.

As a result, as shown in FIG. 8f, the grooves 9, 10 and discharge holes 11 are formed between the artificial tooth 1 and the denture base 3, so that even if unevenness occurs on the labial side, the buccal side, or in the lingual direction when the artificial tooth 1 is embedded, the adhesive 12 is allowed to easily flow and the filling amount can be controlled.

Figure 9A:
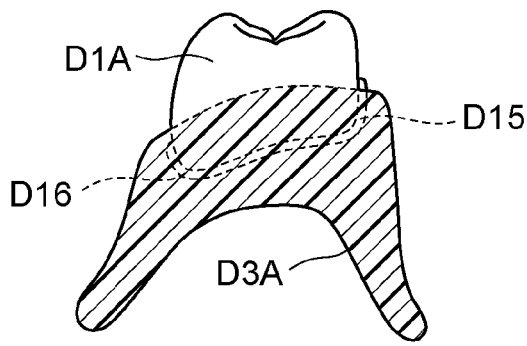
FIG. 9a is a conceptual diagram of the denture design process program.
Figure 9B:
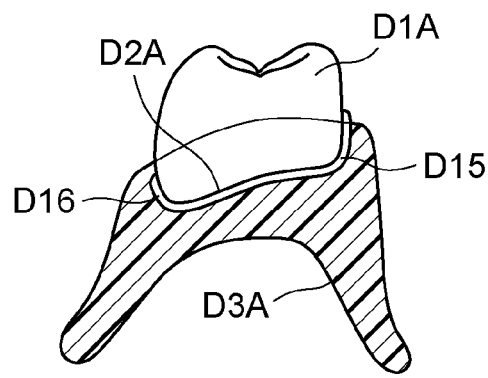
FIG. 9b is a conceptual diagram of the denture design process program.
Figure 9C:
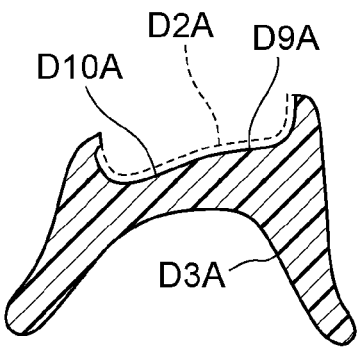
FIG. 9c is a conceptual diagram of the denture design process program.
Figure 9D:
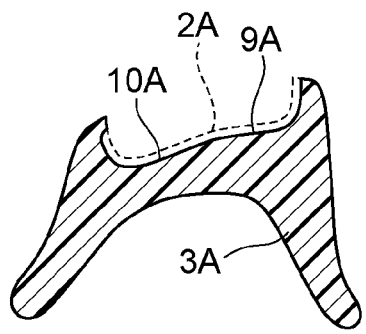
FIG. 9d is a conceptual diagram of the denture design process program.
Figure 9E:
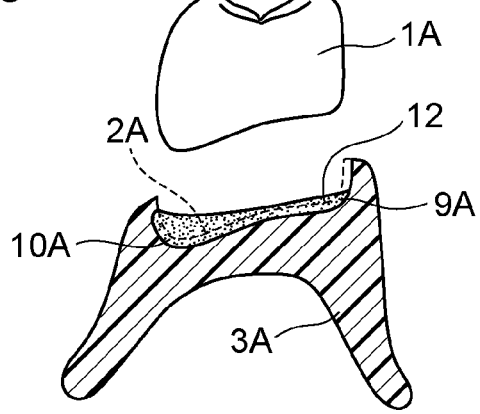
FIG. 9e is a conceptual diagram of the denture design process program.
Figure 9F:
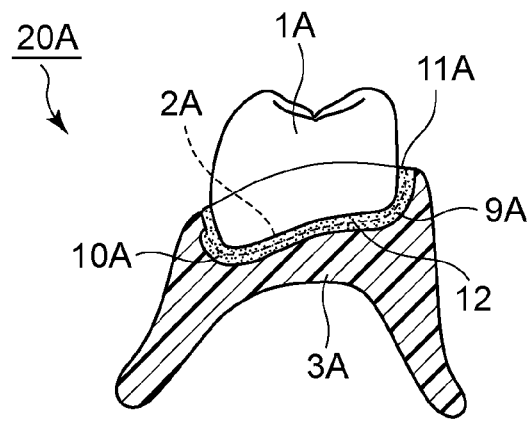
FIG. 9f is a conceptual diagram of the denture design process program.

FIGS. 9a to 9f are conceptual diagrams of an exemplary method for producing the denture 20A. FIGS. 9a to 9f show an example of a process in which the grooves 9A, 10A and the discharge hole 11A are formed by creating the virtual shape data D3A of the denture base 3A based on a computer-aided design program forming a socket D2A by deleting a gingiva of the virtual shape data D3A of the denture base 3A by using virtual shape data D1A of an artificial tooth including rib-shaped convex portions D15, D16 obtained by inverting outward the groove 9 extending to above the cervical line 8 on the lingual side and the groove 10 extending to below the cervical line 8 on the labial or buccal side, producing the denture base 3A based on the virtual shape data D3A, and embedding the artificial tooth 1A not including the grooves 9, 10 in the socket 2A of the denture base 3A. FIGS. 9a to 9c show a design process by the computer-aided design program (CAD), FIG. 9d shows a production process by a computer-aided manufacturing system (CAM), and FIGS. 9e and 9f show a denture assembly process.

Although the processes shown in FIGS. 9a to 9f are substantially the same as the processes shown in FIGS. 8a to 8f, the processes are different from those shown in FIGS. 8a to 8f in that the virtual shape data D1A of the artificial tooth includes the rib-shaped convex portions D15, D16 obtained by inverting the groove 9 and the groove 10 outward, a socket D2A having grooves D9A, D10A is formed by subtracting the virtual shape data D1A of the artificial tooth from the gingiva of the virtual shape data D3A of the denture base 3A using the convex portions D15, D16, and that the artificial tooth 1A without a groove is embedded in the actual production process.

As a result, the grooves 9A, 10A and the discharge hole 11A are formed between the artificial tooth 1A and the denture base 3A, so that even if unevenness occurs on the labial side, the buccal side, or in the lingual direction when the artificial tooth 1A is embedded, the adhesive 12 is allowed to easily flow and the filling amount can be controlled. Another advantage is that since the grooves 9A, 10A and the discharge hole 11A are formed on the socket 2A, it is not necessary to add the grooves 9, 10 to the artificial tooth 1A, so that an artificial tooth having a known shape can be used.

Figure 10A:
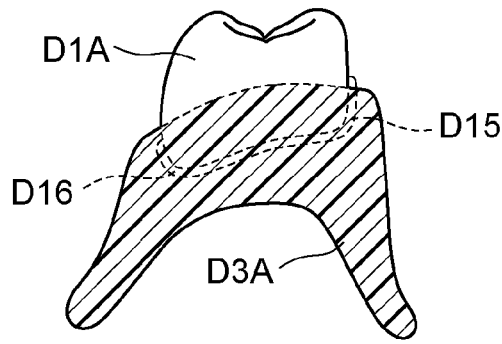
FIG. 10a is a conceptual diagram of the denture design process program.
Figure 10B:
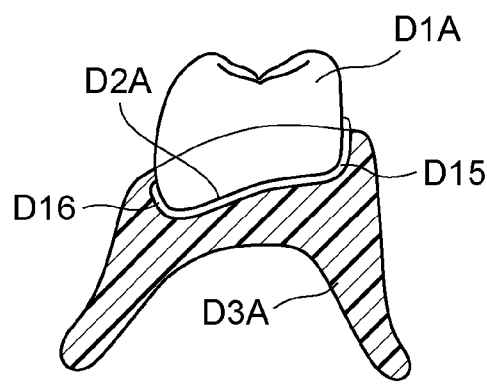
FIG. 10b is a conceptual diagram of the denture design process program.
Figure 10C:
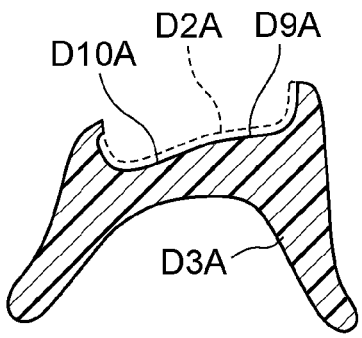
FIG. 10c is a conceptual diagram of the denture design process program.
Figure 10D:
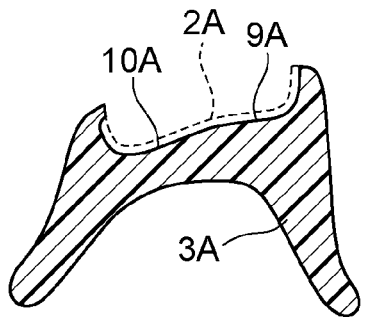
FIG. 10d is a conceptual diagram of the denture design process program.
Figure 10E:
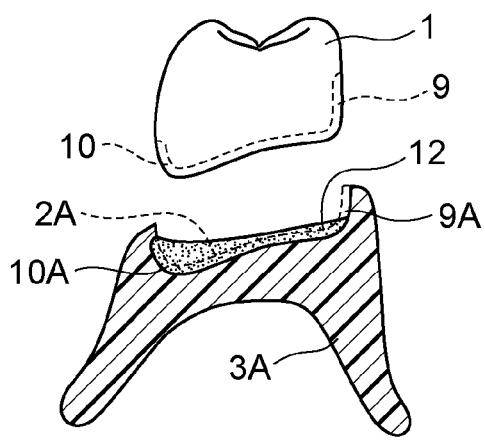
FIG. 10e is a conceptual diagram of the denture design process program.
Figure 10F:
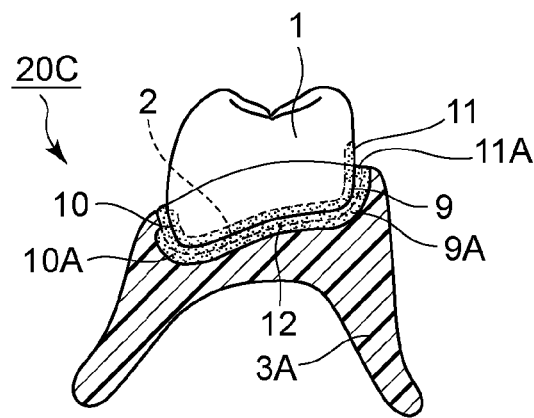
FIG. 10f is a conceptual diagram of the denture design process program.

FIGS. 10a to 10f are conceptual diagrams of an exemplary method for producing a denture 20C. FIGS. 10a to 10f show an example of a process in which the grooves 9, 10, 9A, 10A and the discharge holes 11, 11A are formed by creating the virtual shape data D3A of the denture base 3A based on a computer-aided design program forming the socket D2 by deleting a gingiva of the virtual shape data of the denture base 3A by using the virtual shape data D1A of an artificial tooth including rib-shaped convex portions D15, D16 obtained by inverting outward the groove 9 extending to above the cervical line 8 on the lingual side and the groove 10 extending to below the cervical line 8 on the labial or buccal side, producing the denture base 3A based on the virtual shape data D3A, and embedding the artificial tooth 1A including the grooves 9, 10 in the socket 2A of the denture base 3A. FIGS. 10a to 10c show a design process by the computer-aided design program (CAD), FIG. 10D shows a production process by a computer-aided manufacturing system (CAW), and FIGS. 10E and 10F show a denture assembly process.

Since the socket D2A including the grooves 9A, 10A is formed in the denture base 3A, the contents of the computer-aided design program and the computer-aided manufacturing system shown in FIGS. 10a to 10c are the same as the processes shown in FIGS. 9a to 9d; however, the artificial tooth 1 is embedded in the artificial tooth 1 including the grooves 9, 10 as in the processes shown in FIGS. 8e and 8f.

By adding the grooves 9, 10, 9A, 10A on both surfaces of the artificial tooth 1 and the socket 2A, the grooves having a larger cross-sectional area are formed between the artificial tooth 1 and the denture base 3A as compared to the processes shown in FIGS. 8a to 8f and 9a to 9f, so that the adhesive 12 is allowed to easily flow and the filling amount can be controlled. Therefore, an adhesive having a low viscosity can be selected as the adhesive 12, and an immediate polymerization resin etc. having a short curing time and tending to thicken the coating can be used.

The extending directions of the grooves 9, 10, 9A, 10A may not be the same directions on the artificial tooth 1 side and the denture base 3A side and the grooves can be opened in respective different directions to disperse the distribution of the adhesive 12 in multiple directions.

Figure 11:
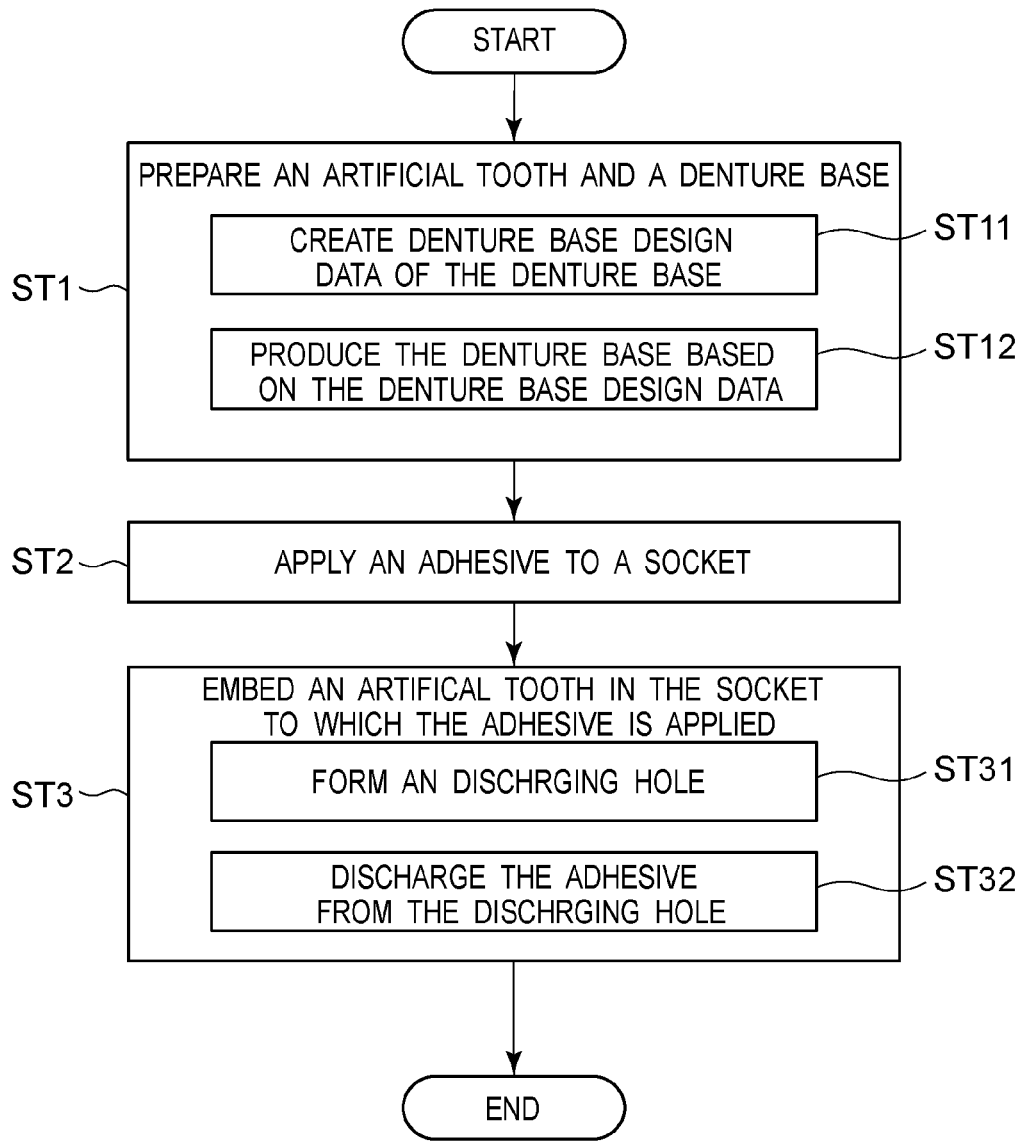
FIG. 11 is a diagram showing an example of a flowchart of a method for manufacturing a denture.

An example of a method for manufacturing the denture 20 will foe described with reference to FIG. 11. FIG. 11 shows an example of a flowchart of the process of manufacturing the denture 20 shown in FIG. 1. As shown in FIG. 11, the method for manufacturing the denture 20 includes steps ST1 to ST3.

Step ST1 is a process of preparing the artificial tooth 1 and the denture base 3. Specifically, step ST1 is a process of preparing the artificial tooth 1 and the denture base 3 provided with the concave socket 2 into which the artificial tooth 1 is embedded.

The artificial tooth 1 is provided with the first groove 9 extending from the basal surface 7 of the artificial tooth 1 to the lingual side surface 5a and the second groove 10 extending from the basal surface 7 of the artificial tooth 1 to the buccal side surface 5b. In the artificial tooth 1, the end 9a of the first groove 9 extending on the lingual side surface 5a is located on the crown side relative to the cervical line 8 on the lingual side of the artificial tooth 1 and the end 10a of the second groove 10 extending on the buccal side surface 5b is located on the root side of the cervical line 8 on the buccal side of the artificial tooth 1. The cross-sectional area of the first groove 9 cut in a direction orthogonal to the extending direction of the first groove 9 may be 0.01 mm$^2$ or more and 10.0 mm$^2$ or less, preferably 0.1 mm$^2$ or more and 4.0 mm$^2$ or less. The cross-sectional area of the second groove 10 cut in the direction orthogonal to the extending direction of the second groove 10 may be 0.01 mm$^2$ or more and 10.0 mm$^2$ or less, preferably 0.1 mm$^2$ or more and 4.0 mm$^2$ or less. The cross-sectional areas of the first groove 9 and the second groove 10 may increase toward the lingual side.

The denture base 3 is acquired, for example, by performing a design process by a computer-aided design program (CAD) and a production process by a computer-aided manufacturing system (CAM).

Step ST1 has steps ST11 and ST12 as a process of preparing the denture base 3.

Step ST11 is a process of creating the denture base design data D3 of the denture base 3 by a computer. Step ST11 is a design process by the computer-aided design program (CAD) shown in FIGS. 8a to 8c.

Specifically, as shown in FIG. 8a, the artificial tooth shape data D1 is disposed on the denture base design data D3 formed as the gingiva without the socket, on the computer. The artificial tooth shape data D1 is shape data of an artificial tooth without a groove on the basal surface. The artificial tooth shape data D1 is arranged to overlap with the gingiva of the denture base design data D3.

Subsequently, as shown in FIG. 8b, the gingiva overlapping with the artificial tooth shape data D1 in the denture base design data D3 is deleted on the computer. In the denture base design data D3, the deleted portion of the gingiva serves as the socket D2.

Subsequently, as shewn in FIG. 8c, the artificial tooth shape data D1 is deleted to acquire the denture base design data D3 provided with the socket D2 on the computer. The denture base design data D3 is output to a producing device producing the denture base 3.

Step ST12 is a process of producing the denture base 3 based on the denture base design data D3. Step ST12 is the production process by the computer-aided manufacturing system (CAM) shown in FIG. 8d.

Specifically, as shown in FIG. 8d, the denture base 3 is produced based on the denture base design data D3 by the producing device. The producing device may be a cutting device using an NC machine tool, a 3D printer, etc. As a result, the denture base 3 provided with the concave socket 2 for embedding the artificial tooth 1 is acquired.

Step ST2 is a process of applying the adhesive 12 to the socket 2. Step ST2 is the denture assembly process shown in FIG. 8e. At step ST2, the adhesive 12 is applied to the socket 2 as shown in FIG. 8e.

Step ST3 is a process of embedding the artificial tooth 1 in the socket 2 to which the adhesive 12 is applied. Step ST3 is the denture assembly process shown in FIG. 8f. At step ST3, as shown in FIG. 8f, the artificial tooth 1 is embedded in the socket 2 to which the adhesive 12 is applied. Step ST3 has steps ST31 and ST32.

Figure 12:
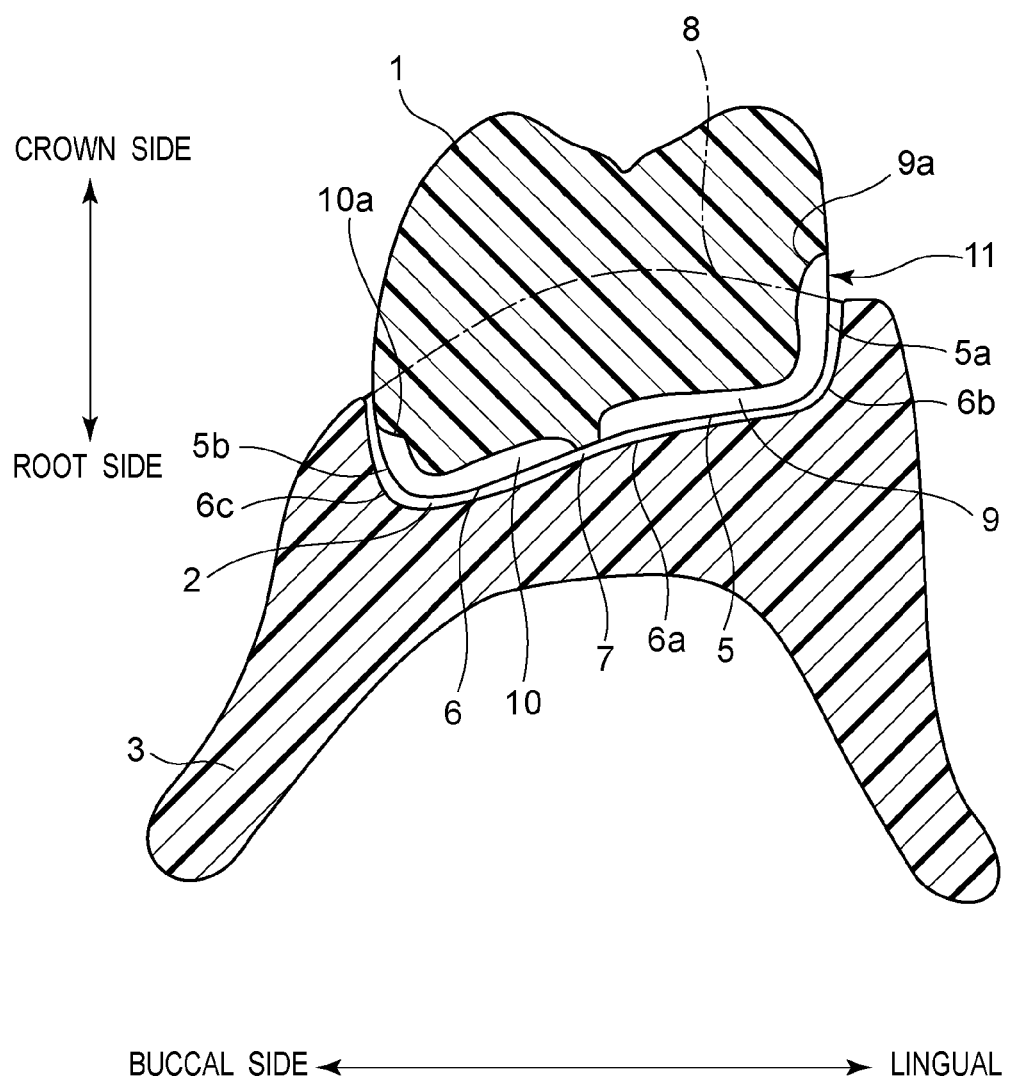
FIG. 12 is a conceptual diagram for explaining an example of a process of forming a discharge hole.

Step ST31 is a process of forming the discharge hole 11. FIG. 12 is a conceptual diagram for explaining an example of the process of forming the discharge hole 11. In the example shown in FIG. 12, the adhesive 12 is not shown for simplicity. In the example shown in FIG. 12, the artificial tooth 1 is embedded in the socket 2 to which the adhesive 12 is applied. The depth of the socket 2 is substantially equal to the cervical line 8 of the artificial tooth 1. In the artificial tooth 1, the end 9a of the first groove 9 extending on the lingual side surface 5a is located on the crown side relative to the cervical line 8. Therefore, when the artificial tooth 1 is embedded in the socket 2, the end 9*a* side of the first groove 9 is exposed from the denture base 3. In other words, the end 9*a* side of the first groove 9 is not closed by the concave side surface 6*b* of the socket 2 of the denture base 3. As a result, the discharge hole 11 for discharging the excess adhesive 12 can be formed on the lingual side surface 5*a* of the artificial tooth 1.

Figure 13:
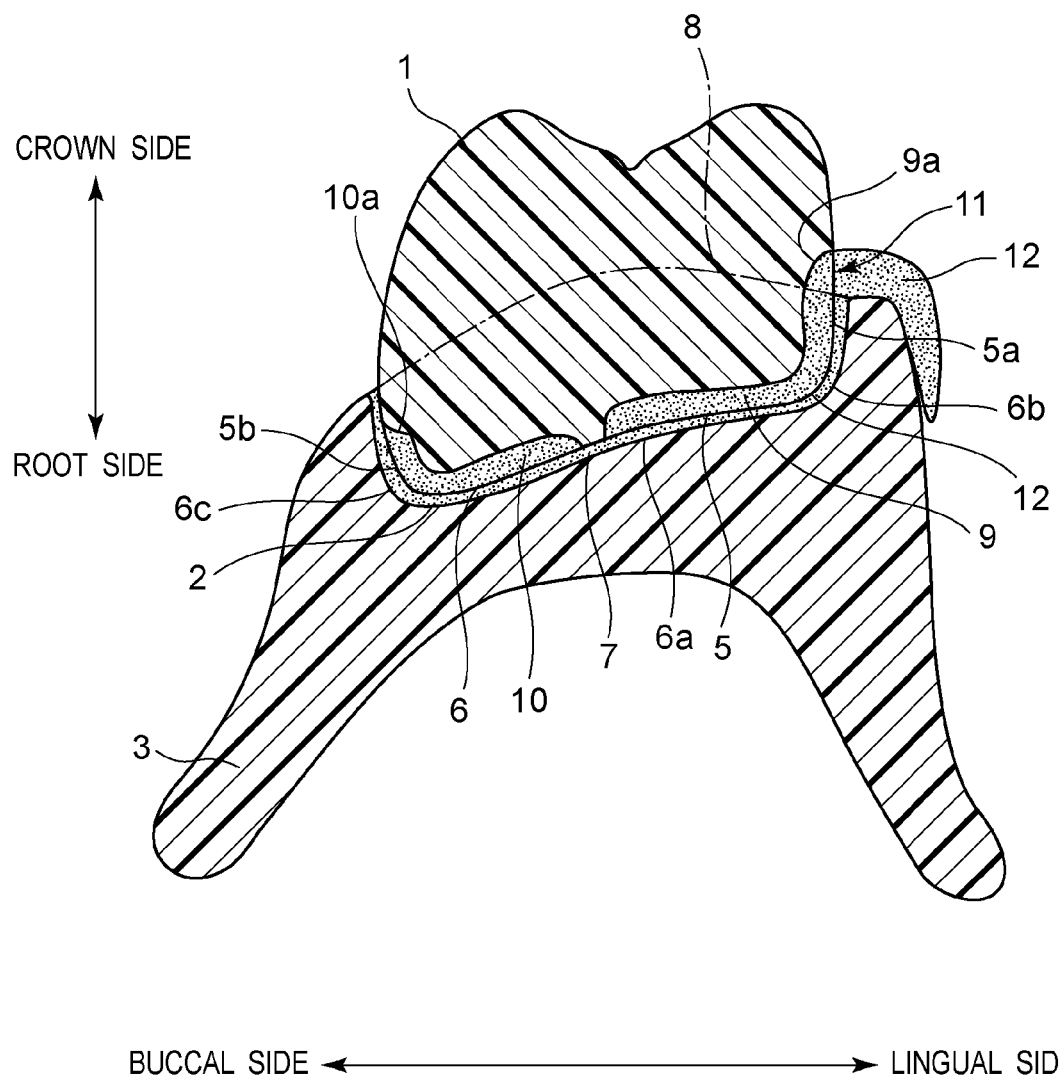
FIG. 13 is a conceptual diagram for explaining an example of a process of discharging an adhesive from the discharge hole.

Step ST32 is a process of discharging the adhesive 12 from the discharge hole 11. FIG. 13 is a conceptual diagram for explaining an example of the process of discharging the adhesive 12 from the discharge hole 11. In the example shown in FIG. 13, when the artificial tooth 1 is embedded in the socket 2 to which the adhesive 12 is applied, the excess adhesive 12 is discharged from the discharge hole 11 through the first groove 9.

When the artificial tooth 1 is embedded in the socket 2 to which the adhesive 12 is applied, the artificial tooth 1 may be embedded in the socket 2 while the buccal side surface 5*b* of the artificial tooth 1 is in contact with the concave side surface 6*b* of the socket 2. This suppresses leakage of the adhesive 12 from the buccal side, and the adhesive 12 is easily discharged from the discharge hole 11 formed on the lingual side.

The excess adhesive 12 discharged from the discharge hole 11 is removed and, when the adhesive 12 is cured, the denture 20 shown in FIG. 8*f* is completed.

An example of the method for manufacturing the denture 20A shown in FIG. 6 will be described as another example. The processes of the method of manufacturing the denture 20A are the same as the flowchart shown in FIG. 11.

As shown in FIG. 11, the method for manufacturing the denture 20A includes steps ST1 to ST3.

Step ST1 is a process of preparing the artificial tooth 1A and the denture base 3A. Specifically, step ST1 is a process of preparing the artificial tooth 1A and the denture base 3A provided with the concave socket 2A into which the artificial tooth 1A is embedded.

The artificial tooth 1A is an artificial tooth without a groove on the surface 5 facing the socket 2A. The denture base 3A is provided with the third groove 9A extending from the concave bottom surface 6*a* of the socket 2A facing the basal surface of the artificial tooth 1A to the lingual concave side surface 6*b* and the fourth groove 10A extending from the concave bottom surface 6*a* of the socket 2A to the buccal concave side surface 6*c*. The end 9*b* of the third groove 9A extending on the lingual concave side surface 6*b* reaches the lingual outer surface 6*d* of the denture base 3A. Therefore, the end 9*b* of the third groove 9A is exposed from the outer surface 6*d* of the denture base 3A. The end 10*b* of the fourth groove 10A extending on the buccal concave side surface 6*c* does not reach the buccal outer surface 6*e* of the denture base 3A. The cross-sectional area of the third groove 9A cut in a direction orthogonal to the extending direction of the third groove 9A may be 0.01 mm$^2$ or more and 10.0 mm$^2$ or less, preferably 0.1 mm$^2$ or more and 4.0 mm$^2$ or less. The cross-sectional area of the fourth groove 10A cut in the direction orthogonal to the extending direction of the fourth groove 10A may be 0.01 mm$^2$ or more and 10.0 mm$^2$ or less, preferably 0.1 mm$^2$ or more and 4.0 mm$^2$ or less. The cross-sectional areas of the third groove 9A and the fourth groove 10A may increase toward the lingual side.

The denture base 3A is acquired, for example, by performing a design process by a computer-aided design program (CAD) and a production process by a computer-aided manufacturing system (CAM).

Step ST1 has steps ST11 and ST12 as a process of preparing the denture base 3A.

Step ST11 is a step of creating the denture base design data D3A of the denture base 3A by a computer. Step ST11 is a design process by the computer-aided design program (CAD) shown in FIGS. 9A to 9C.

Specifically, as shown in FIG. 9*a*, the artificial tooth shape data D1A is disposed on the denture base design data D3A formed as the gingiva without the socket on the computer. The artificial tooth shape data D1 is arranged to overlap with the gingiva of the denture base design data D3A.

The artificial tooth shape data D1A is the shape data of the artificial tooth in which the first convex portion D15 and the second convex portion D16 respectively corresponding to the third groove 9A and the fourth groove 10A are disposed on the basal surface. The first convex portion D15 protrudes from near the center of the basal surface of the artificial tooth shape data D1A and extends over the lingual side surface. The end of the first convex portion D15 extending on the lingual side surface is located on the crown side relative to the cervical line 8. The second convex portion D16 protrudes from near the center of the basal surface of the artificial tooth shape data D1A and extends over the buccal side surface. The end of the second convex portion D16 extending on the buccal side surface is located on the root side relative to the cervical line 8.

Subsequently, as shown in FIG. 9*b*, the gingiva overlapping with the artificial tooth shape data D1A in the denture base design data D3A is deleted on the computer. In the denture base design data D3A, the deleted portion of the gingiva serves as the socket D2A, the third groove D9A, and the fourth groove D10A.

Subsequently, as shown in FIG. 9*c*, the artificial tooth shape data D1A is deleted to acquire the denture base design data D3A provided with the socket D2A on the computer. The denture base design data D3 is output to a producing device producing the denture base 3A.

Step ST12 is a process of producing the denture base 3A based on the denture base design data D3A. Step ST12 is the production process by the computer-aided manufacturing system (CAM) shown in FIG. 9*d*.

Specifically, as shown in FIG. 9*d*, the denture base 3A is produced based on the denture base design data D3A by the producing device. The producing device may be a cutting apparatus using an NC machine tool, a 3D printer, etc. As a result, the denture base 3A provided with the concave socket 2A for embedding the artificial tooth 1A, the third groove 9A, and the fourth groove 10A is acquired.

Step ST2 is a process of applying the adhesive 12 to the socket 2A. Step ST2 is the denture assembly step shown in FIG. 9*e*. At step ST2, the adhesive 12 is applied to the socket 2A as shown in FIG. 9*e*.

Step ST3 is a process of embedding the artificial tooth 1A in the socket 2A to which the adhesive 12 is applied. Step ST3 is the denture assembly step shown in FIG. 9*f*. At step ST3, as shown in FIG. 9*f*, the artificial tooth 1A is embedded in the socket 2A to which the adhesive 12 is applied. Step ST3 has steps ST31 and ST32.

Figure 14:
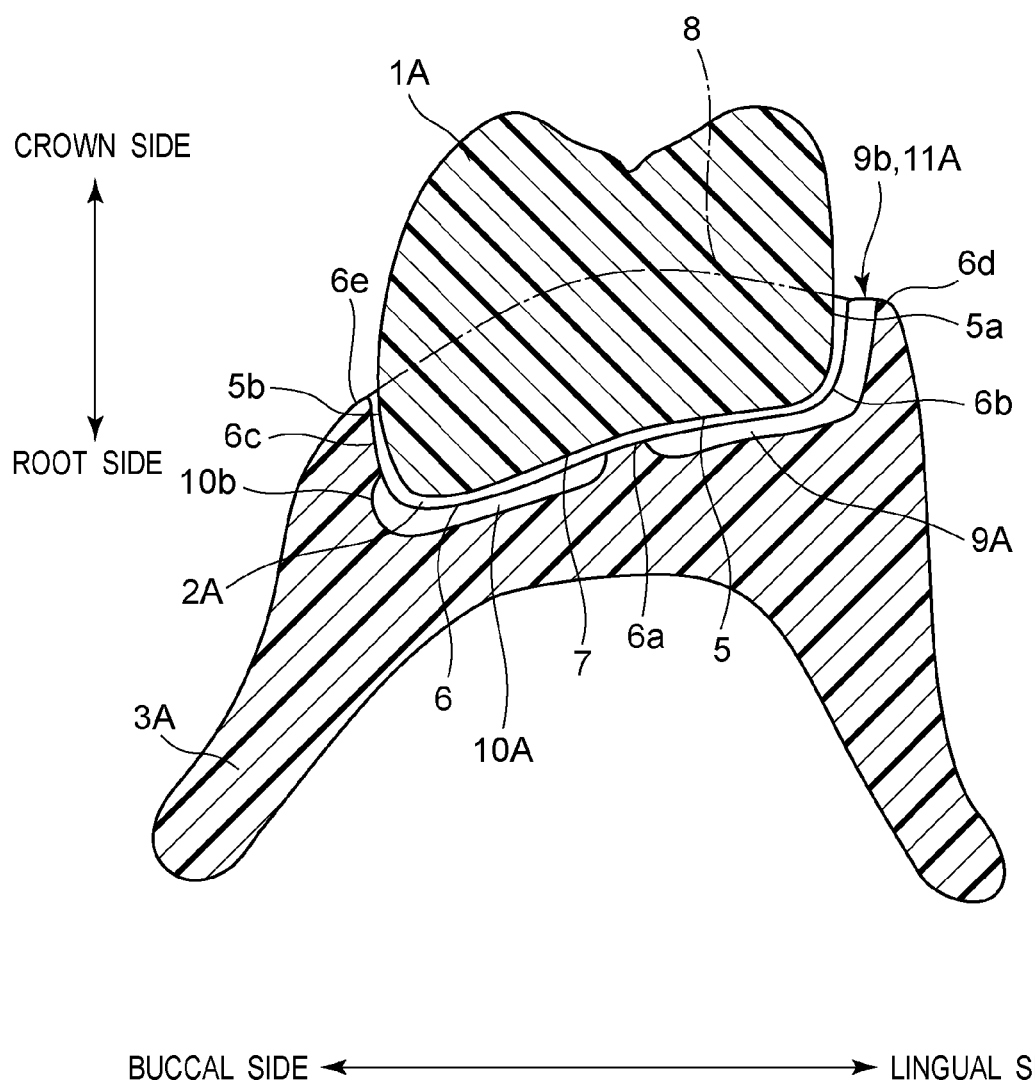
FIG. 14 is a conceptual diagram for explaining an example of a process of forming a discharge hole.

Step ST31 is a process of forming the discharge hole 11A. FIG. 14 is a conceptual diagram for explaining an example of the process of forming the discharge hole 11A. In the example shown in FIG. 14, the adhesive 12 is not shown for simplicity. In the example shown in FIG. 14, the artificial tooth 1A is embedded in the socket 2A to which the adhesive 12 is applied. The depth of the socket 2A is substantially equal to the cervical line 8 of the artificial tooth 1A. In the denture base 3A, the third groove 9A and the fourth groove 10A are disposed on the inner surface 6 of the socket 2A. Specifically, the third groove 9A extends from the concave bottom surface 6a of the socket 2A facing the basal surface 7 of the artificial tooth 1A to the lingual concave side surface 6b. The fourth groove 10A extends from the concave bottom surface 6a of the socket 2A to the buccal concave side surface 6c. The end 9b of the third groove 9A extending on the lingual concave side surface 6b reaches the lingual outer surface 6d of the denture base 3A, and the end 10b of the fourth groove 10A extending on the buccal concave side surface 6c is does not reach the buccal outer surface 6e of the denture base 3A.

Therefore, when the artificial tooth 1A is embedded in the socket 2A, the third groove 9A and the fourth groove 10A on the inner surface 6 side of the socket 2A are closed by the artificial tooth 1A via the adhesive 12. In this case, the end 9b of the third groove 9A extending on the lingual concave side surface 6b reaches the lingual outer surface 6d of the denture base 3A and communicates with the outside of the denture base 3A, so that the discharge hole 11A discharging the excess adhesive 12 is formed at the end 9b of the third groove 9A.

Figure 15:
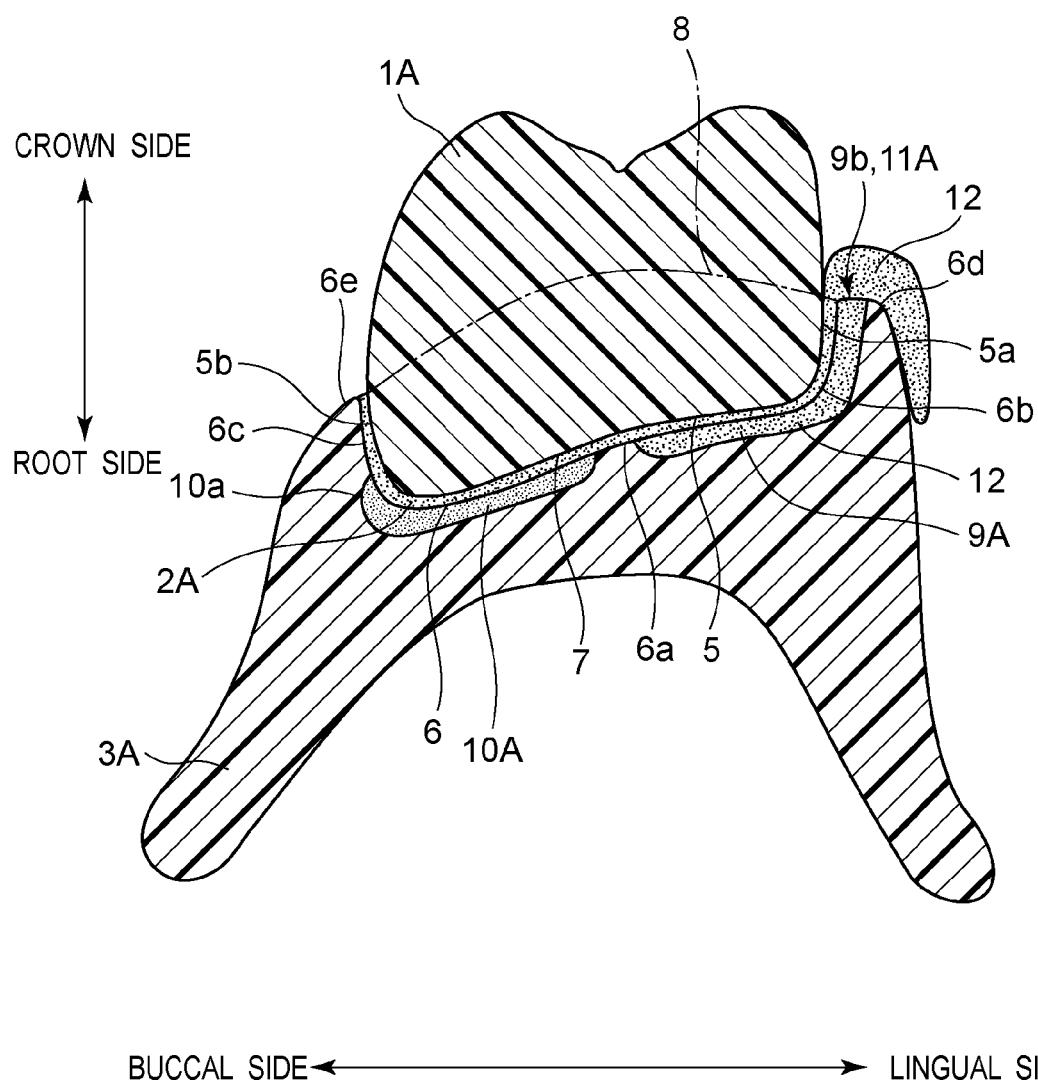
FIG. 15 is a conceptual diagram for explaining an example of a process of discharging an adhesive from the discharge hole.

Step ST32 is a process of discharging the excess adhesive 12 from the discharge hole 11A. FIG. 15 is a conceptual diagram for explaining an example of the process of discharging the adhesive 12 from the discharge hole 11A. In the example shown in FIG. 15, when the artificial tooth 1A is embedded in the socket 2A to which the adhesive 12 is applied, the excess adhesive 12 is discharged from the discharge hole 11A through the third groove 9A.

When the artificial tooth 1A is embedded in the socket. 2A to which the adhesive 12 is applied, the artificial tooth 1A may be embedded in the socket 2A while the buccal side surface 5b of the artificial tooth 1A is in contact with the concave side surface 6b of the socket 2A. This suppresses leakage of the adhesive 12 from the buccal side, and the adhesive 12 is easily discharged from the discharge hole 11A formed on the lingual side.

The denture 20C shown in FIGS. 10a to 10f obtained by combining the artificial tooth 1 and the denture base 3A can be manufactured by combining the methods for manufacturing the denture 20 and the denture 20A. The denture 20B shown in FIG. 7 including the artificial tooth 1 having a plurality of connected teeth can also be manufactured by performing the same manufacturing method as the method for manufacturing the denture 20.

Steps ST1 to ST3 shown in FIG. 11 are exemplifications, and the methods of manufacturing the dentures 20, 20A, 20B, 20C are not limited to these steps. For example, the manufacturing method may include additional steps, or steps ST1 to ST3 may be integrated, divided, or deleted.

The dentures 20, 20A, 20B, 20C manufactured by the manufacturing methods are improved in the accuracy of fitting of the artificial teeth 1, 1A to the sockets 2, 2A. Since the adhesive 12 is disposed in the grooves 9, 10, 9A, 10A, the adhesiveness to the artificial teeth 1, 1A is improved. Therefore, the artificial teeth 1, 1A and the denture bases 3, 3A can accurately be bonded and fixed with the improved accuracy of fitting of the artificial teeth 1, 1A to the sockets 2, 2A.

In this embodiment, an example of forming the multiple grooves 9, 10, 9A, 10A in the artificial tooth 1 and/or the denture base 3A has been described; however, the present invention is not limited thereto. For example, one or more of the grooves 9, 9A, 13 extending on the lingual side may be disposed on at least one of the surface 5 of the artificial teeth 1, 1A on the side embedded in the socket 2, 2A and the inner surface 6 defining the sockets 2, 2A. In other words, the grooves 10, 10A extending on the buccal or labial side are not essential constituent elements.

In this embodiment, since the examples of the artificial teeth 1, 1A mainly made up of the molar portions have been described, the opposite side of the lingual side is the buccal side in the examples. However, when the artificial teeth 1, 1A are made up of the central incisors, the lateral incisors, or the canines, the opposite side of the lingual side may be replaced with the labial side.

The invention claimed is:

1. A method for manufacturing a denture, comprising:
preparing an artificial tooth and a denture base with a concave socket;
applying an adhesive to the concave socket; and
embedding the artificial tooth in the concave socket to which the adhesive is applied,
wherein:
a first socket groove is defined on an inner surface defining the concave socket;
the first socket groove extends from a concave bottom surface of the concave socket facing a basal surface of the artificial tooth to a lingual concave side surface of the concave socket;
a second socket groove extends from the concave bottom surface of the concave socket to a buccal or labial concave side surface of the concave socket;
an end of the second socket groove does not reach a buccal or labial outer surface of the denture base; and
the embedding the artificial tooth in the concave socket includes:
forming a discharge hole to discharge the adhesive, the discharge hole being defined at an end of the first socket groove on a lingual outer surface of the denture base; and
discharging the adhesive from the discharge hole.

2. The method according to claim 1, wherein a cross-sectional area of the first socket groove obtained by cutting in a direction orthogonal to an extending direction of the first socket groove is 0.01 mm$^2$ or more and 10.0 mm$^2$ or less.

3. The method according to claim 1, wherein:
a cross-sectional area of the first socket groove obtained by cutting in a direction orthogonal to an extending direction of the first socket groove continuously increases toward a lingual side of the denture base; and
an opening area of the discharge hole is greater than the cross-sectional area of the first socket groove in a middle part from the basal surface of the artificial tooth to the concave bottom surface of the concave socket.

4. The method according to claim 1, wherein:
the preparing the artificial tooth and the denture base includes:
creating, by a computer, denture base design data of the denture base; and
producing, by a producing device, the denture base based on the denture base design data, and
the denture base design data is created based on artificial tooth shape data including a first convex portion and a second convex portion corresponding to a shape of the first socket groove and a shape of the second socket groove, respectively.

5. The method according to claim 1, wherein the artificial tooth includes at least two or more adjacent teeth out of a central incisor, a lateral incisor, a canine, a first premolar, a second premolar, a first molar, and a second molar.

6. A denture comprising:
an artificial tooth; and a denture base with a concave socket in which the artificial tooth is embedded,
wherein:
a first socket groove is defined on an inner surface defining the concave socket;
the first socket groove extends from a concave bottom surface of the concave socket facing a basal surface of the artificial tooth to a lingual concave side surface of the concave socket;
a second socket groove extends from the concave bottom surface of the concave socket to a buccal or labial concave side surface of the concave socket;
an end of the second socket groove does not reach a buccal or labial outer surface of the denture base;
a discharge hole is defined at an end of the first socket groove on a lingual outer surface of the denture base; and
the artificial tooth and the denture base are bonded and fixed by an adhesive while the adhesive is in the first socket groove.

7. The denture according to claim 6, wherein the artificial tooth includes at least two or more adjacent teeth out of a central incisor, a lateral incisor, a canine, a first premolar, a second premolar, a first molar, and a second molar.

8. The denture according to claim 6, wherein a cross-sectional area of the first socket groove obtained by cutting in a direction orthogonal to an extending direction of the first socket groove is 0.01 mm$^2$ or more and 10.0 mm$^2$ or less.

9. The denture according to claim 8, wherein the artificial tooth includes at least two or more adjacent teeth out of a central incisor, a lateral incisor, a canine, a first premolar, a second premolar, a first molar, and a second molar.

10. The denture according to claim 6, wherein:
a cross-sectional area of the first socket groove obtained by cutting in a direction orthogonal to an extending direction of the first socket groove continuously increases toward a lingual side of the denture base; and
an opening area of the discharge hole is greater than the cross-sectional area of the first socket groove in a middle part from the basal surface of the artificial tooth to the concave bottom surface of the concave socket.

* * * * *